United States Patent
Pierce

[19]

[11] Patent Number: 6,060,265
[45] Date of Patent: *May 9, 2000

[54] METHODS FOR THE DETOXIFICATION OF NITRILE AND/OR AMIDE COMPOUNDS

[75] Inventor: George E. Pierce, Lebanon, N.J.

[73] Assignee: Cytec Technology Corporation, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 09/104,774

[22] Filed: Jun. 25, 1998

Related U.S. Application Data

[63] Continuation-in-part of application No. 08/769,080, Dec. 18, 1996, Pat. No. 5,863,750, and a continuation-in-part of application No. PCT/US97/23862, Dec. 18, 1997.

[51] Int. Cl.$^7$ .............................. C12Q 1/02; C12Q 1/00; C12P 13/00; C07C 229/00

[52] U.S. Cl. .............................. 435/29; 435/4; 435/843; 435/128; 435/129; 562/572; 558/303

[58] Field of Search .................................. 435/29, 4, 843, 435/128, 129; 562/572; 558/303

[56] References Cited

U.S. PATENT DOCUMENTS

| | | | |
|---|---|---|---|
| 3,940,332 | 2/1976 | Kato et al. ................................ | 435/29 |
| 4,343,900 | 8/1982 | Watanabe .................................. | 435/29 |
| 4,390,631 | 6/1983 | Watanabe et al. ........................ | 435/29 |

(List continued on next page.)

FOREIGN PATENT DOCUMENTS

| | | | |
|---|---|---|---|
| 0 014 364 | 1/1980 | European Pat. Off. .................. | 435/29 |
| 0 127 581 | 5/1984 | European Pat. Off. .................. | 435/29 |
| 0 243 966 B1 | 4/1987 | European Pat. Off. .................. | 435/29 |

(List continued on next page.)

OTHER PUBLICATIONS

Aimin, Z. et al., 1995, "Production and Properties of 3-Cyanopyriding Hydratase in *Rhodococcus equi* SHB-121", Applied Biochemistry and Biotechnology 53:65–73.

Aislabie and Atlas, 1988, "Biodegradation of Nitriles in Shale Oil", Applied and Environmental Microbiology 54:2197–2202.

Arnaud, A. et al., 1976, "Amidase Activity of Some Bacteria", Folia Microbiol. 21:178–184.

(List continued on next page.)

*Primary Examiner*—Louise N. Leary
*Attorney, Agent, or Firm*—Pennie & Edmonds LLP

[57] ABSTRACT

The present invention describes methods for the detoxification of a mixture of nitrile compounds, or a mixture of nitrile and amide compounds by conversion of the nitrile compound(s) to the corresponding amide or acid compounds using a pure culture of an induced microorganism strain capable of converting a nitrile moiety to an amide or acid moiety. If an amide is formed or is present in the mixture, the amide can be further converted, using the present methods for detoxification, to the corresponding acid. The acid can then, if desired, be further degraded to $CO_2$, $H_2O$ and biomass. The induced pure cultures are able to detoxify a mixture of nitriles or a mixture of nitriles and amides which are typically present, in high concentration(s), in nitrile production waste streams. The present invention further discloses methods for removing a nitrile compound from an amide preparation, such as an acetamide or acrylamide preparation containing an unwanted nitrile compound, using an induced pure culture of an induced microorganism strain capable of converting a nitrile moiety to an amide or acid moiety. The pure cultures are able to purify or reduce the toxicity of the amide preparation thus improving purity and amide product yield from the amide preparation. The present invention further discloses methods for the conversion of a mixture of amide compounds to the corresponding acid compounds using a pure culture of an induced microorganism strain capable of converting an amide moiety to an acid moiety. This invention also discloses kits, biofilters and methods for use of the kits and biofilters for detoxification containing the useful microorganism strains.

27 Claims, 8 Drawing Sheets

U.S. PATENT DOCUMENTS

| | | |
|---|---|---|
| 4,629,700 | 12/1986 | Prevatt et al. ............................. 435/29 |
| 4,637,982 | 1/1987 | Yanada et al. ............................. 435/29 |
| 4,687,807 | 8/1987 | Wetgrove et al. ......................... 435/29 |
| 4,742,114 | 5/1988 | Wetgrove et al. ......................... 435/29 |
| 4,810,648 | 3/1989 | Stalker ...................................... 435/29 |
| 4,851,342 | 7/1989 | Watanabe et al. ......................... 435/29 |
| 4,894,341 | 1/1990 | Richardson ............................... 435/29 |
| 4,900,672 | 2/1990 | Yanada et al. ............................. 435/29 |
| 4,908,313 | 3/1990 | Satoh et al. ............................... 435/29 |
| 4,971,698 | 11/1990 | Weber et al. .............................. 435/29 |
| 5,034,329 | 7/1991 | Cerbelaud et al. ........................ 435/29 |
| 5,041,375 | 8/1991 | Nakayama et al. ........................ 435/29 |
| 5,049,499 | 9/1991 | Atlas et al. ................................ 435/29 |
| 5,089,405 | 2/1992 | Cerbelaud et al. ........................ 435/29 |
| 5,100,782 | 3/1992 | Klages et al. .............................. 435/29 |
| 5,135,858 | 8/1992 | Yamada et al. ............................ 435/29 |
| 5,143,827 | 9/1992 | Atlas et al. ................................ 435/29 |
| 5,179,014 | 1/1993 | Watanabe et al. ......................... 435/29 |
| 5,200,331 | 4/1993 | Kawakami et al. ....................... 435/29 |
| 5,206,158 | 4/1993 | Clifford et al. ............................ 435/29 |
| 5,238,838 | 8/1993 | Kula et al. ................................. 435/29 |
| 5,283,193 | 2/1994 | Yamamoto et al. ....................... 435/29 |
| 5,395,758 | 3/1995 | Takashima et al. ....................... 435/29 |
| 5,540,840 | 7/1996 | Heitkamp et al. ......................... 435/29 |
| 5,563,053 | 10/1996 | Takashima et al. ....................... 435/29 |
| 5,863,570 | 1/1999 | George ...................................... 435/29 |
| 5,863,750 | 1/1999 | Pierce ........................................ 435/29 |

FOREIGN PATENT DOCUMENTS

| | | |
|---|---|---|
| 0 243 967 B1 | 4/1987 | European Pat. Off. .................. 435/29 |
| 0 274 856 B1 | 12/1987 | European Pat. Off. .................. 435/29 |
| 0 272 025 | 6/1988 | European Pat. Off. .................. 435/29 |
| 0 272 026 | 6/1988 | European Pat. Off. .................. 435/29 |
| 0 329 325 | 8/1989 | European Pat. Off. .................. 435/29 |
| 0 393 916 | 10/1990 | European Pat. Off. .................. 435/29 |
| 0 502 476 A2 | 3/1992 | European Pat. Off. .................. 435/29 |
| 0 707 061 A1 | 10/1995 | European Pat. Off. .................. 435/29 |
| 52-94470 | 8/1977 | Japan ........................................ 435/29 |
| 53-86078 | 7/1978 | Japan ........................................ 435/29 |
| 53-86079 | 7/1978 | Japan ........................................ 435/29 |
| WO 91/15520 | 10/1991 | WIPO ....................................... 435/29 |
| WO 92/05205 | 4/1992 | WIPO ....................................... 435/29 |
| WO 96/18724 | 6/1996 | WIPO ....................................... 435/29 |
| WO 97/06248 | 2/1997 | WIPO ....................................... 435/29 |

OTHER PUBLICATIONS

Asano, Y. et al., 1982, "Aliphatic Nitrile Hydratase from Arthrobacter sp. J–1 Purification and Characterization", Agric. Biol. Chem. 46:1165–1174.

Asano, Y. et al., 1982, "Purification and Characterization of Amidase which Participates in Nitrile Degradation", Agric. Biol. Chem. 46:1175–1181.

Asano, Y. et al., 1980, "Degradation of Dinitriles by *Fusarium merismoides* TG–1", Agric. Biol. Chem. 44:2497–2498.

Babu, G.R.V. et al., "*Pseudomonas marginalis*: Its Degradative Capability on Organic Nitriles and Amides", 94th ASM General Meeting, Friday, Session 295, p. 466.

Bernet, N. et al., 1991, "Bioconversion of Acrylonitrile into Acrylamide Using a Highly Compact Multiphasic Reactor", The Chemical Engineering Jounal 46:B43–B51.

Biotechnology Newswatch, Oct. 4, 1993, "Allied Signal to Market Bioreactor", p. 10.

Brown, L. et al., 1980, "Model Studies of the Degradation of Acrylamide Monomer", Water Research 14:775–778.

Chapatwala, K.D. et al., 1993, "Degradation of Nitriles and Amides by the Immobilized Cells of *Pseudomonas putida*", World Journal of Microbiology and Biotechnology 9:483–486.

Chapatwala, K. et al., 1993, "Degradative Capability of *Pseudomonas putida* on Acetonitrile", Applied Biochemistry and Biotechnology 39:655–666.

Chapatwala, K. et al., 1992, "Degradation of Acetonitrile and Biphenyl Compounds by a Mixed Microbial Culture", Environmental Toxicology and Chemistry 11:1145–1151.

Chebrou, H. et al., 1996, "Amide Metabolism: A Putative ABC Transporter in Rhodococcus sp. R312", Gene 182:215–216.

Collins and Knowles, 1983, "The Utilization of Nitriles and Amides by *Nocardia rhodochrous*", J. of Gen. Microbiology 129:711–718.

Donberg, P. et al., 1992, "Biodegradation of Acrylonitrile in Soil", Environmental Toxicology and Chemistry 11:1583–1594.

Fawcett and Scott, 1960, "A Rapid and Precise Method for the Determination of Urea", J. Clin. Pathol. 13:156–159.

Finnerty, W., 1992, "The Biology and Genetics of the Genus Rhodococcus", Annu. Rev. Microbiol. 46:193–218.

Fradet, H. et al., 1985, "Hydration of Nitriles Using a Bacterial Nitrile–Hydratase immobilized on DEAE–Cellulose", Biotechnology and Bioengineering 27:1581–1585.

Hashimoto, Y. et al., 1994, "Nitrile Hydratase Gene from Rhodococcus sp. N–774 Requirement for Its Downstream Region for Efficient Expression", Biosci. Biotech. Biochem. 58:1859–1865.

Hirrlinger, B. et al., 1996, "Purification and Properties of an Amidase from *Rhodococcus erythropolis* MP50 Which Enantioselectively Hydrolyzes 2–Arylpropionamides", J. of Bacteriology 178:3501–3507.

Hwang and Chang, 1989, "Biotransformation of Acrylonitrile to Acrylamide Using Immobilized Whole Cells of Brevibacterium CH1 in a Recycle Fed–Batch Reactor", Biotechnology and Bioengineering 34:380–386.

Kincannon, D. et al., 1983, "Removal Mechanisms for Toxic Priority Pollutants", Journal WPCF 55:157–163.

Kobayashi and Shimizu, 1994, "Versatile Nitrilases: Nitrile–Hydrolysing Enzymes", FEMS Microbiology Letters 120:217–224.

Kobayashi, M. et al., 1993, "Amidase Coupled with Low–Molecular–Mass Nitrile Hydratase from *Rhodococcus rhodochrous* J1", Eur. J. Biochem. 217:327–336.

Kobayashi, M. et al., 1993, "Occurrence of Amidase in the Industrial Microbe *Rhodococcus rhodochrous* J1", Biosci. Biotech. Biochem. 57:1949–1950.

Kobayshi et al., 1992, "Enzymatic Synthesis of Acrylamide: A Success Story Not Yet Over", Trends Biotechnol. 10:402–408.

Kobayashi, M. et al., 1991, "Cloning, Nucleotide Sequence and Expression in *Escherichia coli* of Two Cobalt–Containing Nitrile Hydratase Genes from *Rhodococcus rhodochrous* J1", Biochemica et Biophysica Acta 1129:23–33.

Komeda, H. et al., 1997, "A Novel Transporter Involved in Cobalt Uptake", Proc. Natl. Acad. Sci. USA 94:36–41.

Komeda, H. et al., 1996, "Characterization of the Gene Cluster of High–Molecular–Mass Nitrile Hydratase (H–NHase) Induced by its Reaction Product in *Rhodococcus rhodochrous* J1" Proc. Natl. Acad. Sci. USA 93:4267–4272.

Komeda, H. et al., 1996, "A Novel Gene Cluster including the *Rhodococcus rhodochrous* J1 nh/BA Genes Encoding a Low Molecular Mass Nitrile Hydratase (L–NHase) Induced by Its Reaction Product", J. of Biol. Chemistry 271:15796–15802.

Langdahl, B. et al., 1996, "Nitrile Hydrolysis by *Rhodococcus erythropolis* BL–1, an Acetonitrile–Tolerant Strain Isolated from a Murine Sediment", Microbiology 142:145–154.

Lee, C.Y., 1993, "Bench–scale Production of Acrylamide Using the Resting Cells of Brevibacterium sp. CH2 in a Fed–Batch Reactor" Enzyme Microb. Technol. 15:979–984.

Lee, C.Y. et al., 1991, "Acrylonitrile Adaptation of Brevibacterium sp. CH1 for Increased Acrylamide Production", Enzyme Microb. Technol. 13:53–58.

Martinkova, L. et al., 1996, "Enantioselectivity of the Nitrile Hydratase from *Rhodococcus equi* A4 Towards Substituted (R,S)–2–Arylpropionitriles", Biotechnology Letters 18:1073–1076.

Martinkova, L. et al., 1992, "Isolation of Acetonitrile–Utilizing Bacteria", Folia Microbiol. 37:372–376.

Nagasawa, T. et al., 1991, "Optimum Culture Conditions for the Production of Cobalt–Containing Nitrile Hydratase by *Rhodococcus rhodochrous* J1", Appl. Microbiol. Biotechnol. 34:783–788.

Nagasawa, T. et al., 1991, "Characterization of a New Cobalt–Containing Nitrile Hydratase Purified from Urea–Induced Cells of *Rhodococcus rhodochrous* J1", Eur. J. Biochem. 196:581–589.

Nagasawa, T. et al., 1988, "Occurance of a Cobalt–Induced and Cobalt–Containing Nitrile Hydratase in *Rhodococcus rhodochrous* J1", Biochemical and Biophysical Research Communications 155:1008–1016.

Narayanasamy, K. et al., 1990, "Utilization of Acrylonitrile by Bacteria Isolated from Petrochemical Waste Waters", Indian Journal of Exp. Biology 28:968–971.

Nawaz, M. et al., 1994, "Degradation of Aliphatic Amide Mixture by Immobilized and Nonimmobilized Cells of Pseudomonas sp.", Environ. Sci. Technol. 28:1106–1109.

Nawaz, M. et al., 1996, "Physical, Biochemical, and Immunological Characterization of a Thermostable Amidase from *Klebsiella pneumoniae* NCTR 1", J. of Bacteriology 178:2397–2401.

Nawaz, M. et al., 1994, "Purification and Characterization of an Amidase from an Acrylamide–Degrading Rhodococcus sp.", Applied and Environmental Microbiology 60:3343–3348.

Nawaz et al., 1993, "Degradation of Acrylamide by Immobilized Cells of a Pseudomonas sp. and *Xanthomonas maltophilia*" Can. J. Microbiol. 39:207–212.

Nawaz, M. et al., 1992, "Metabolism of Benzonitrile and Butyronitrile by *Klebsiella pneumoniae*", Applied and Environmental Microbiology 58:27–31.

Nawaz, M. et al., 1989, "Degradation of Acetonitrile by *Pseudomonas putida*", Applied and Environmental Microbiology 55:2267–2274.

Nawaz, M. et al., 1989, "Degradation of Acetronitrile by *Pseudomonas Aeroginosa*", 43rd Purdue University Industrial Waste Conference Proceedings, p. 251–256.

Novo, C. et al., 1995, "*Pseudomonas aeruginosa* Aliphatic Amidase is Related to the Nitrilase/Cyanide Hydratase Enzyme Family and Cys[166] is Predicted to be the Active Site Nucleophile of the Catalytic Mechanism", FEBS Letters 367:275–279.

Pogorelova et al., 1996, "Cobalt–dependent transcription of the nitrile hydratase gene in *Rhodococcus rhodochrous* M8", FEMS Microbiology Letters 144:191–195.

Stanier et al., 1966, "The Aeorbic Pseudomonads: A Taxonomic Study", J. Gen. Microbiol. 43:159–271.

Sunarko and Meyer, 1989, "A Microbiological System for the Detoxification of Acetonitrile in HPLC Waste ", Dechema Biotechnology Conferences, 3:859–862.

Supelco Chromatography Products Catalog, pp. 653–656.

Thiery, A. et al., 1986, "Nitriles as Growth Substrates for Brevibacterium sp. R 312 and Its Mutant M2" Zentralbl. Mikrobiol. 141:575–582.

Vokounova, M. et al., 1993, "Effect of pH on Microbial Decomposition of the Herbicide Bromoxynil", Environmental Microbiology 38:107–108.

Warhurst and Fewson, 1994, "Biotransformations Catalyzed by the Genus Rhodococcus", Critical Reviews in Biotechnology 14:29–73.

Watanabe, I. et al., 1987, "Optimal Conditions for Cultivation of Rhodococcus sp. N–774 and for Conversion of Acrylonitrile to Acrylamide by Resting Cells", Agric. Biol. Chem. 51:3201–3206.

Weissermel and Arpe, 1978, *Industrial Organic Chemistry*, Verlag Chemie, Weinheim New York, pp. 266–270.

White, J.M. et al., 1988, "Conversion of Cyanide to Formate and Ammonia by a Pseudomonad Obtained from Industrial Wastewater", J. of Industrial Microbiology 3:263–272.

Wilson, S. et al., 1995, "Identification of Two New Genes in the *Pseudomonas aeruginosa* Amidase Operon, Encoding an ATPase (AmiB) and a Putative Integral Membrane Protein (AmiS)", J. of Biol. Chemistry 270:18818–18824.

Wyatt and Knowles, 1995, "The Development of a Novel Strategy for the Microbial Treatment of Acrylonitrile Effluents", Biodegradation 6:93–107.

Yamada and Nagasawa, 1990, "Production of Useful Amides by Enzymatic Hydration of Nitriles", Annals NY Academy of Sciences, p. 142–154.

Yamamoto, K. et al., 1992, "Purification and Characterization of the Nitrilase from *Alcaligenes faecalis* ATCC 8750 Responsible for Enantioselective Hydrolysis of Mandelonitrile", J. of Fermentation and Bioengineering 73:425–430.

Yanenko, A. et al., 1995, "Regulation of Nitrile Utilization in Rhodococcus", Proceedings of the Ninth Symposium on the Actinomycetes, p. 139–144.

Arinbasarova, A. et al., 1990, "Lysoamidase Biosynthesis by Immobilized Cells", Mikrobiologya pp. 24–28.

Chistoserdov et al., 1994, "Genetic Organization of the mau Gene Cluster in *Methylobacterium extorquens* AMI: Complete Nucleotide Sequence and Generation and Characteristics of mau Mutants", J. Bacteriol. 176:4052–4065.

Chistoserdov et al., 1994, "Organization of the Methylamine Utilization (mau) Genes in *Methylophilus methylotrophus* W3A1–NS", J. Bacteriol. 176:4073–4080.

Derango et al., 1997 "Enzyme Mediated Polymerization of Acrylic Monomers", Biotechnol. Techniques 6:523–526.

Gak et al., 1995, "Cloning, Sequencing, and Mutation of a Gene for Azurin in *Methylobacillus flagellatum* KT", J. Bacteriol. 177:4575–4578.

Wyborn et al., 1996, "Molecular Characterization of Formidase from *Methylophilus methylotrophus*", Eur. J. Biochem. 240:314–322.

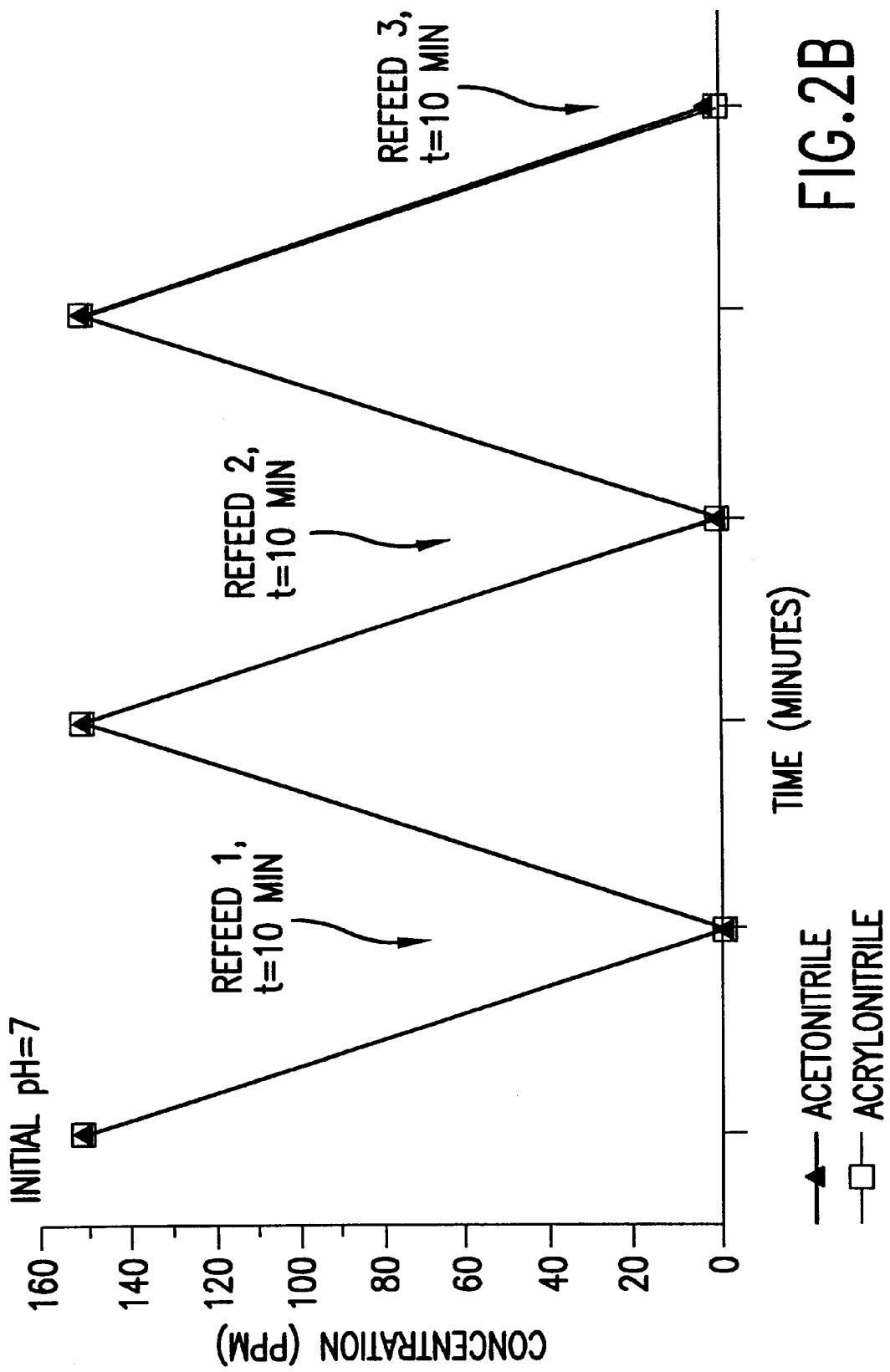

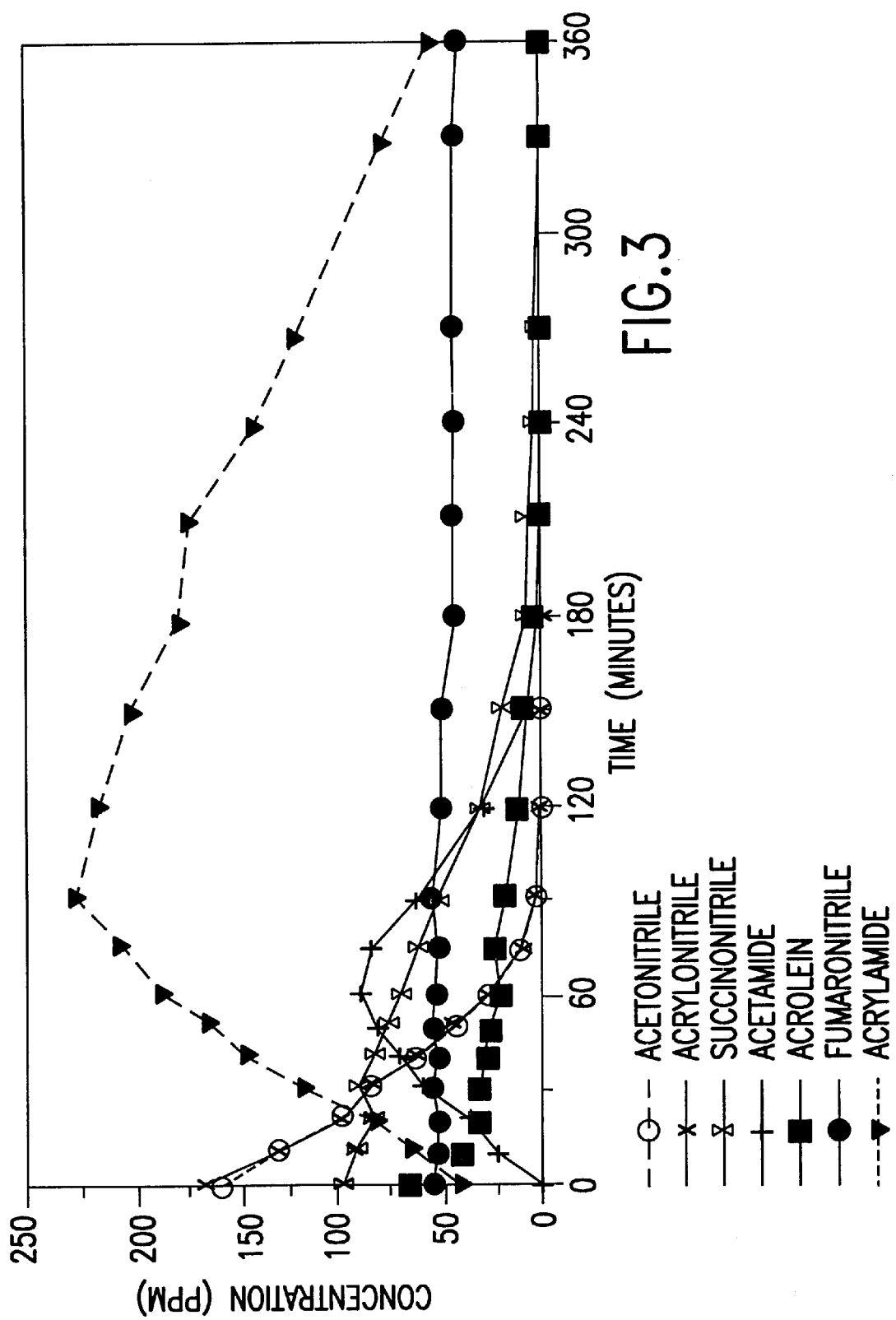

METHODS FOR THE DETOXIFICATION OF NITRILE AND/OR AMIDE COMPOUNDS

The present application is a continuation-in-part of U.S. application Ser. No. 08/769,080, filed Dec. 18, 1996, now U.S. Pat. No. 5,863,750 and a continuation-in-part of International Application PCT/US97/23862, filed Dec. 18, 1997, both of which are incorporated by reference herein in their entirety.

1. FIELD OF THE INVENTION

The present invention is related to methods for the detoxification of a mixture of nitrile compounds, or a mixture of nitrile and amide compounds by conversion of the nitrile compounds to the corresponding amide or acid compounds using a pure culture of an induced microorganism strain capable of converting a nitrile moiety to an amide or acid moiety. If an amide is formed or is present in the mixture, the amide can be further converted, using the present methods for detoxification, to the corresponding acid. The acid can then, if desired, be further degraded to $CO_2$, $H_2O$ and biomass. The induced pure cultures are able to detoxify a mixture of nitriles or a mixture of nitriles and amides which are typically present, in high concentration(s), in nitrile production waste streams.

The present invention is further related to methods for removing a nitrile compound from an amide preparation, such as an acetamide or acrylamide preparation containing an unwanted nitrile compound, using a pure culture of an induced microorganism strain capable of converting a nitrile moiety to an amide or acid moiety. The induced pure cultures are able to purify or reduce the toxicity of the amide preparation thus improving purity and yield of an amide product from the amide preparation.

The present invention is further related to methods for the conversion of a mixture of amide compounds to the corresponding acid compounds using a pure culture of an induced microorganism strain capable of converting an amide moiety to an acid moiety.

The present invention is also related to biofilters and methods for use of the biofilters for detoxification of a mixture of nitriles or a mixture of nitrile and amide compounds or a mixture of amide compounds.

This invention also relates to kits containing the useful multiply induced microorganism strains.

2. BACKGROUND OF THE INVENTION

Nitriles are exceedingly versatile compounds that can be used in the synthesis of a wide variety of compounds, including amines, amides, amidines, carboxylic acids, esters, aldehydes, ketones, imines, and heterocyclics. One of the most important commercially important nitriles is acetonitrile which is a common solvent. Other nitrile compounds are used as herbicides or in the synthesis of detergents or antiseptics. Another of the most commercially important nitriles is acrylonitrile, which is used to make acrylamide, acrylic acid, acrylic fibers, copolymer resins and nitrile rubbers.

One method of production of acrylonitrile is by use of the SOHIO/BP process, which entails the direct ammoxidation of propene (a/k/a propylene) by ammonia vapors in air in the presence of a catalyst (see generally, *Acrylonitrile*, 1979, Process Economics Program Report, Stanford Research International, Menlo Park, Calif.; Weissermel and Arpe, 1978, *Industrial Organic Chemistry*, Verlag Chemie—Weinheim N.Y., pp. 266–270). The waste stream from this process contains a complex mixture of nitriles, including dinitriles, amides and acids at high concentrations. More particularly, the wastestream generally contains nitriles such as acetonitrile, acrylonitrile, succinonitrile and fumaronitrile as well as acrylamide. In addition, cyanide(s) at variable and/or high concentrations is/are often present. The wastestream generally contains high and/or variable concentrations of ammonium sulfate. This hazardous waste effluent cannot be released into the environment due to its toxicity and in the United States is usually disposed of by deep well injection into sub-surface formations. Such disposal cannot be considered to be a "treatment" of the wastestream, but rather is analogous to the process of landfilling.

Outside the United States, it has been common practice to "treat" the wastestream from the production of acrylonitrile by diluting the wastestream to a low total nitrile concentration of about 250 ppm or less and treating by conventional aerated biological wastestream systems, i.e., activated sewage sludge, after wet/air oxidation, which removes volatiles and partially oxidizes many of the organic constituents. Such method of "treatment" is not suitable to efficient disposal of a nitrile production facility wastestream for the following reasons: (1) wet/air oxidation causes volatile compounds to be stripped, creating an air emission problem; (2) dilution of the wastestream necessitates large wastewater treatment facilities to handle the flow and long residence time required to obtain adequate "treatment"; and (3) combination of wet/air oxidation with biological treatment by activated sludge results in high treatment costs. There remains a long, deep felt need in the nitrile production industry for an efficient, cost effective, environmentally sound method to dispose of the effluent of nitrile production plants.

It has long been known that certain microorganisms are useful to convert a nitrile compound to its corresponding amide or acid compound biologically. Both the scientific and patent literature contain numerous references describing the use of nitrile converting microorganisms for the production of specialty chemicals, for example, acrylamide and acrylic acid or acrylate from acrylonitrile. See generally, Kobayshi et al., 1992, Trends Biotechnol. 10:402–408. The nitrile converting microorganisms have been shown to have activities including, nitrilase, which converts a nitrile compound to its corresponding acid compound; nitrile hydratase, which converts a nitrile compound to its corresponding amide compound; and amidase, which converts an amide compound to its corresponding acid compound.

To the knowledge of the present inventor, however, in all these specialty chemical productions using nitrile degrading microorganisms, only a single compound has been employed to induce the relevant activity and only a single nitrile compound has been converted to produce a single desired specialty compound.

2.1. Microorganisms which can utilize a Nitrile Compound

The literature contains certain references which disclose a number of microorganisms which can utilize a nitrile or an amide compound as the sole source of carbon and/or nitrogen.

For example, Asano et al., 1982, Agric. Biol. Chem. 46:1165–1174, describe an isolated strain of Arthrobacter which is able to grow using acetonitrile as a sole source of carbon and nitrogen.

Nawaz et al., 1989, 43rd Purdue Ind. Waste Conf. Proc., pp. 251–256 (Nawaz, 1989), describe the isolation of a *Pseudomonas aeruginosa* strain which is able to utilize various nitrile compounds, including acetonitrile, as a sole source of carbon and energy. However, this strain is unable to utilize other nitrile compounds such as acrylonitrile, acrylamide, benzonitrile and malononitrile.

Nawaz et al., 1992, Appl. Environ. Microbiol. 58:27–31 (Nawaz), describe a *Klebsiella pneumonia* NCTR1 strain which, after acclimation using benzonitrile, could degrade a mixture of benzonitrile and one other nitrile selected from butyronitrile, acetonitrile, glutaronitrile, propionitrile, succinonitrile and methacrylonitrile. In complete contrast to the present method for induction which does not require the presence of an aromatic nitrile, Nawaz's microorganism required benzonitrile in order to induce the ability to degrade the mixtures of benzonitrile and one other nitrile. Moreover, and most importantly, in order to achieve degradation of any of the mixtures of nitriles, benzonitrile had to be present. Since the nitrile wastestream of a nitrile production facility does not contain benzonitrile, this organism and the method disclosed by Nawaz would be completely impractical and, in fact, inoperative for treating such wastestream.

Chapatwala et al., 1993, App. Biochem. Biotech. 39/40:655–666, describe the isolation of a *Pseudomonas putida* strain which is capable of utilizing acetonitrile as a sole source of carbon and nitrogen. However, there is no disclosure of utilization of any other nitrile-containing compound by the strain.

Narayanasamy et al., 1990, Indian J. Exp. Biol. 28:968–971, disclose the utilization of acrylonitrile, acetonitrile, acrylamide and acetamide by an Arthrobacter sp. individually. There is no indication that the bacterial strain is able to degrade dinitriles or a mixture of nitriles.

O'Grady and Pembroke, 1994, Biotech. Letters 16:47–50, describe the isolation of an Agrobacterium sp. and the ability of the isolated strain to utilize or break down a number of different nitrile compounds individually. There is no indication that the isolated strain would be able to utilize or break down a mixture of the nitrile compounds.

Martinkova et al., 1992, Folia Microbiol. 37:373–376, disclose the isolation of several bacterial strains, including Corynebacterium sp. strain 3 B and *Agrobacterium radiobacter* strain 8/4/1, which are able to utilize acetonitrile as a sole source of carbon and nitrogen. There 30 is no disclosure that the strains are able to utilize any other nitrile compound or a mixture of nitrile compounds.

Nawaz et al., 1994, Appl. Environ. Microbiol. 60:3343–3348, describe the isolation of a bacterium, tentatively identified as a Rhodococcus sp., from soil contaminated with the herbicide alachlor. This bacterium was shown to be able to use acrylonitrile as a sole source of carbon and nitrogen.

Nawaz et al., 1993, Can. J. Microbiol. 39:207–212, describe the isolation of a Pseudomonas sp. and *Xanthomonas maltophilia*, which each can utilize acrylamide as a sole source of carbon and nitrogen.

Armitage et al., International Patent Publication WO 97/06248, published Feb. 20, 1997, discloses methods for producing an amidase by culturing a suitable microorganism in the presence of an amide or an amide precursor, such as a nitrile, or a mixture thereof, under continuous culture, carbon-limiting conditions in which the amide or amide precursor forms at least 20% mol and preferably substantially all of the carbon. Suitable microorganisms include Pseudomonas, Rhodococcus, etc. Also disclosed are methods for producing a nitrilase by culturing a microorganism in the presence of a nitrile or a nitrile precursor, or a mixture thereof, under continuous culture carbon-limiting culture conditions. Suitable microorganisms include Nocardia, Rhodococcus spp., including Rhodococcus ATCC 39484, etc. The induced enzyme is then used, inter alia, to convert a nitrile or amide to its corresponding acid.

Although microorganisms which utilize a nitrile compound might possibly be useful to remove a single nitrile compound from a nitrile containing composition, the use of such organisms to aid in the disposal of the wastestream of a nitrile production facility is not to be expected because nitrile utilization is dependent upon the expression of a nitrilase or nitrile hydratase specific to the single nitrile compound utilized. Expression of a specific nitrilase or nitrile hydratase does not assure that the microorganism will have the ability to convert the mixture of nitrile compounds or the mixture of nitrile and amide compounds present in the high concentrations found in the wastestream of a nitrile production facility.

2.2. Treatment of Nitrile Wastes Including a Wastestream of a Nitrile Production Plant A number of references describe attempts to provide a microbiological method to remove a nitrile from a nitrile waste, including the wastestream of a nitrile production plant.

U.S. Pat. No. 3,940,332 to Kato et al. (Kato) describes the use of an isolated bacterial strain, *Nocardia rubropertincta*, ATCC Accession No. 21930, in combination with activated sludge from a sewage treatment plant to degrade a wastestream containing nitriles and inorganic cyanides. Kato also indicates that the bacterial strain is able to degrade nitriles, including, acetonitrile, acrylonitrile, propionitrile, butylonitrile, crotononitrile, fumaronitrile, valeronitrile, glutaronitrile, and benzonitrile, although no indication is given of the amount of each of such nitriles or conditions under which the nitriles are degraded or whether the nitriles can be degraded together. There is no indication that the strain disclosed by Kato can degrade or detoxify a mixture of nitrile compounds. Further, the nitrile waste treated by Kato was a low strength waste, 50–250 ppm total nitrile concentration. Moreover, the present inventor has tested the strain disclosed by Kato and found that the strain does not remove acetonitrile from a mixture of nitrites with the same efficiency as can be accomplished using the methods of the present invention.

Sunarko and Meyer, 1989, DECHMA Biotech. Conf. 3:859–862, disclose that lyophilized cells of Mycobacterium UBT5, Bacillus UBT2, Corynebacterium UBT9, and Flexibacter UBT4, which had been induced by growing the cells in the presence of 2-pentenenitrile, were able to degrade small quantities of acetonitrile found in laboratory HPLC column effluent.

Brown et al., 1980, Water Res. 14:775–778, disclose that acrylamide spiked at concentrations of 0.5 ppm to 5 ppm into natural and polluted waters of the environment resulted in the degradation of the acrylamide.

Kincannon et al., 1983, Journal WPCF 55:157–163, disclose that a mixture of microorganisms isolated from a municipal activated sludge water treatment plant was able to degrade acrylonitrile after a one month acclimation period. Further, the authors also showed that acrolein could be similarly degraded by the mixture of microorganisms.

Donberg et al., 1992, Environ. Toxicol. Chem. 11:1583–1594, disclose that a mixture of microorganisms found in soil was able to degrade acrylonitrile under aerobic conditions. Some mixtures were able to degrade 10–100 ppm acrylonitrile on the order of 2 days. However, at higher concentrations of acrylonitrile (1000 ppm), degradation was inhibited. The authors speculated that the inhibition was due to inhibitory effects of the parent acrylonitrile compound.

Knowles and Wyatt, European Patent No. 274 856 B1 and Wyatt and Knowles, 1995, Biodegradation 6:93–107, describe the degradation of a mixture of nitrile and amide compounds from the wastestreams of a nitrile production plant (using the BP/SOHIO process of acrylonitrile production) by a mixture of microorganisms. The use of a mixture of microorganisms rather than a pure culture, is a serious drawback of the method of Knowles and Wyatt. It is difficult to maintain a mixed culture, for as the conditions of the reaction change, certain strains within the mixed culture will be favored at different times for growth such that the efficacy of degradation can be decreased.

There are a number of disadvantages associated with the above references. For example, many of the individual microbial strains described above have only a limited range of nitrile or amide compounds which they can degrade. The time required for degradation/utilization of nitrile and amide compounds is on the order of days or weeks. Further, disposal by traditional activated sludge treatment has its own drawbacks, such as the large amount of biomass produced, which must eventually be disposed. Moreover, and most importantly, the use of a mixture of microorganisms rather than pure cultures, makes it very difficult because it is difficult to maintain the mixed culture. As conditions of the reaction change, certain strains within the mixed culture will be favored at different times for growth, such that over time the characteristics of the mixed culture will change and the efficacy of degradation can decrease. The mixed culture is not easily reproduced or maintained.

2.3. Treatment of Polyacrylamide Preparations to Remove the Acrylamide Monomer

A number of references describe attempts to provide a microbiological method to remove an unwanted acrylamide monomer from a polyacrylamide preparation.

Polyacrylamide polymers are widely used in several industries, including sewage treatment, paper manufacturing, mining, and in biological and chemical research. However, their utility is restricted and they cannot be used in connection with foodstuffs because they are generally contaminated with unreacted acrylamide monomer which is a cumulative neurotoxin and a carcinogen. One method of reducing the amount of unreacted monomer is the "heat treatment" method. However, this treatment increases the cost of manufacture and decreases the efficiency of polymer production due to undesired branching of the polymers.

Another method is the use of amidase obtained from a microorganism. For example, Carver et al., European Patent Publications EP 272,025 A2 and EP 2072,026 A2, describe the decomposition of acrylamide in polyacrylamide preparations using an amidase obtained from an organism such as Methylophilis sp. which has been heated to a temperature in the range of 40° C. to 80° C. However, the methods disclosed by Carver et al. do not allow for the removal of acrylamide monomer from a cationic polyacylamide preparation at its native pH value, i.e., a native pH of about 4. See FIG. 6 in EP 272,025 A2, which clearly shows that in order for the acrylamide monomer to be removed from the cationic polymer, the pH must be raised from a pH of 4 to a pH of 6.

U.S. Pat. Nos. 4,687,807 and 4,742,114 to Westgrove et al. describe the production of water-in-oil emulsions of amidase for use in removing unwanted acrylamide monomer from a preformed acrylamide polymer.

Farrar et al., European Patent Publication EP 329,325 A2, describes the removal of acrylamide monomer from polyacrylamide using an aqueous gel of amidase obtained from an amidase-expressing microorganism. Farrar, International Patent Publication WO 92/05205, describes reduction of residual (meth)acrylamide monomer in a polymerized (meth)acrylamide by incorporating amidase into a polymerizable mixture for exothermic polymerization of polymeric (meth)acrylamide.

Armitage et al., International Patent Publication WO 97/06248, published Feb. 20, 1997, also discloses methods for the conversion of meth(acrylamide) to ammonium meth (acrylate) in or after the ploymerization of the acrylamide using an amidase which has been induced in a suitable microorganism obtained by culturing the microorganism in the presence of an amide or an amide precursor, such as a nitrile, or a mixture thereof, under continuous culture, carbon-limiting conditions in which the amide or amide precursor forms at least 20% mol and preferably substantially all of the carbon. Suitable microorganisms include Pseudomonas, Rhodococcus, etc. However, no working examples are provided in which the induced enzyme actually converts the acrylamide monomer in a polyacrylamide preparation, and further, there is no disclosure regarding the pH range in which the conversion reaction could take place.

Citation or identification of any reference in Section 2 or any section of this application shall not be construed as an admission that such reference is available as prior art to the present invention.

3. SUMMARY OF THE INVENTION

Methods for the detoxification of a mixture of nitrile compounds or a mixture of nitrile and amide compounds or a mixture of amide compounds using a pure culture of induced microorganisms or an extract thereof are provided by the present invention. The methods of employing the microorganisms are useful for the detoxification of such mixtures of compounds in the form of gases, aerosols or fluids, including liquids.

According to one embodiment of the present invention, a method for multiply inducing a microorganism strain to detoxify a mixture of nitrile compounds or a mixture of nitrile and amide compounds is provided. In one mode of this embodiment, the method entails culturing a pure culture of a microorganism strain on nutritionally complete medium containing a mixture of nitrile compounds or a mixture of nitrile and amide compounds. In another mode of this embodiment, the method entails culturing a pure culture of a microorganism strain on minimal medium containing a mixture of nitrile compounds or a mixture of nitrile and amide compounds as the sole source of carbon and energy and/or nitrogen.

The methods for multiple induction do not require the presence of an aromatic nitrile; however, according to one embodiment, the ability to detoxify an aromatic nitrile is achieved advantageously without of the use of an aromatic nitrile.

According to one embodiment of the present invention, a method for multiply inducing a microorganism strain to detoxify a mixture of amide compounds is provided. In one mode of this embodiment, the method entails culturing a pure culture of a microorganism strain on nutritionally complete medium containing a mixture of nitrile(s) and amide(s). In another mode of this embodiment, the method entails culturing a pure culture of a microorganism strain on minimal medium containing a mixture of nitrile(s) and amide(s) as the sole source of carbon and energy and/or nitrogen.

In another embodiment of the present invention, a method for obtaining a microorganism which can detoxify a mixture of nitrile compounds or a mixture of nitrile and amide compounds is provided. In general, this method comprises culturing a pure culture of a microorganism (or a defined mixed culture of microorganisms composed of a mixture of known pure cultures) with a mixture of nitrile compounds or a mixture of nitrile and amide compounds, under aerobic conditions, and recovering, from the cultured microorganism(s), a microorganism which detoxifies a mixture of nitrile compounds or a mixture of nitrile and amide compounds such as those normally found in nitrile production waste streams at high concentration(s) as in nitrile production waste streams. The recovered microorganism can be isolated to provide a pure culture of a microorganism capable of detoxifying a mixture of nitrile compounds or a mixture of nitrile and amide compounds.

In another embodiment of the present invention, a method for obtaining a microorganism which can detoxify a mixture of amide compounds is provided. In general, this method comprises culturing a pure culture of a microorganism (or a defined mixed culture of microorganisms composed of a mixture of known pure cultures) with a mixture of nitrile(s) and amide(s), under aerobic conditions, and recovering, from the cultured microorganism(s), a microorganism which detoxifies a mixture of amide compounds. The recovered microorganism can be isolated to provide a pure culture of a microorganism capable of detoxifying a mixture of amide compounds.

The pure cultures of the microorganisms can be stored for extended periods of time after induction, e.g., at least 4 months under normal refrigeration temperatures, i.e., about 4° C., longer (years) under normal freezer temperatures, i.e., −20° C. or lower or when freeze-drying or cryopreservation is employed, without the loss of detoxification activity. In addition, the microorganisms can rapidly and efficiently detoxify relatively high concentration(s) of nitrile compound(s). Further, the microorganisms can tolerate a wide range of concentrations of nitrile and/or amide compound(s). Certain microorganisms are capable of utilizing at least one of the nitrile compounds as a sole source of carbon and energy. Certain microorganisms are capable of utilizing at least one of the nitrile or amide compounds as a sole source of carbon and energy and nitrogen.

According to another embodiment of the present invention, a method for the detoxification of a mixture of nitrile compounds or a mixture of nitrile and amide compounds is provided. In a preferred embodiment, the method entails contacting a mixture of nitrile compounds or a mixture of nitrile and amide compounds with a pure culture of a microorganism strain, said strain selected from the group consisting of microorganisms having ATCC Accession Nos. 55899, 55898, 55722, 55723, 55726, 55727, 55724, and 55725, which has been induced to detoxify said mixture of nitriles and/or amides, for a sufficient time to convert the nitriles and/or amides to the corresponding amides and/or acids. The pure culture of induced microorganisms need not be actively dividing or even alive when used in the methods of the present invention.

In an alternative preferred embodiment, the method entails contacting a crude extract of a pure culture of microorganism strain, said strain selected from the group consisting of microorganisms having ATCC Accession Nos. 55899, 55898, 55722, 55723, 55726, 55727, 55724, and 55725, which has been induced to detoxify said mixture of nitriles and/or amides, for a sufficient time to convert the nitrites and/or amides to the corresponding amides and/or acids.

In another embodiment of the present invention, the method of detoxification further comprises adding to the pure culture of microorganisms and/or to the crude extract of the pure culture of microorganisms, one or more nitrile and/or amide degrading enzymes, for example, nitrilase, nitrile hydratase, and amidase, to increase the speed and/or efficiency of detoxification of the nitrile and/or amide compounds.

According to still another embodiment of the present invention, a method for the conversion of a mixture of amide compounds is provided. The amides are converted to the corresponding acid compounds. In a preferred embodiment, the method entails contacting a mixture of amides with a pure culture or a crude extract of a microorganism strain, said strain selected from the group consisting of microorganisms having ATCC Accession Nos. 55899, 55898, 55722, 55723, 55726, 55727, 55724, and 55725, and which has been induced to possess the ability to convert said mixture of amides to acids, for a sufficient time to convert the amides to the corresponding acids.

Yet another embodiment of the present invention provides a hybrid chemical/biological process for producing an amide such as acrylamide or acetamide. This embodiment encompasses an improved process for producing an amide such as acetamide or acrylamide, the improvement comprising contacting an intermediate solution formed during a chemical synthetic process for producing an amide which solution comprises about 30%–50% amide and about >100 and ≦10,000 ppm nitrile, with a multiply induced microorganism, which has been treated to inactivate any amidase activity, for a time sufficient to reduce the concentration of nitrile to less than 100 ppm. The nitrile is converted to acrylamide.

Yet another embodiment of the present invention provides methods for removing an unwanted amide monomer from polyamide preparations, for example, removing acrylamide monomer from a polyacrylamide preparation. An illustrative method entails contacting a polyacrylamide preparation containing acrylamide monomer, said polyacrylamide preparation having a pH of about 2 to less than about 6, with a pure culture or a crude extract of a microorganism strain which has been multiply induced as taught herein for a period of time sufficient to reduce the amount of acrylamide monomer by converting the acrylamide to the corresponding acrylic acid. Preferably, the polyacrylamide preparation has a pH of about 2 to about 5, more preferably a pH of about 3 to about 4. Also, preferably, the amount of acrylamide monomer in the polyacrylamide preparation is reduced to less than 100 ppm.

Yet another embodiment of the present invention provides a biofilter comprising an induced microorganism or an extract thereof and methods for use of the biofilter. Biofilters are used in the detoxification of a mixture of nitrile compounds or a mixture of nitrile and amide compounds or a mixture of amide compounds in effluents, such as air, vapors, aerosols and water or aqueous solutions. Biofilters are also used in the removal of an unwanted amide monomer from a polyamide preparation, for example, removal of acrylamide monomer from a polyacrylamide preparation.

According to another embodiment of the invention, kits containing a pure culture of a microorganism which has been multiply induced to possess the ability to detoxify a mixture of nitrile compounds or a mixture of nitrile and amide compounds or a mixture of amide compounds are provided.

The methods, biofilters and kits of the invention are useful to rapidly detoxify a mixture comprising a variety of nitrile compounds or a mixture of nitrile and amide compounds or a mixture of amide compounds at high concentration(s). The mixture of nitrile compounds or mixture of nitrile and amide compounds or mixture of amide compounds is generally in an aqueous environment. The methods, biofilters and kits of the invention are also useful to remove nitrile compound(s) from an amide preparation containing an unwanted nitrile compound, thus providing a substantially pure amide preparation. In exemplary embodiments, the amide preparation is an acetamide or acrylamide preparation. Further, the methods, biofilters and kits of the invention are also useful to convert an unwanted amide monomer compound(s) in a polyamide or polymerized amide preparation containing an unwanted amide monomer or unpolymerized amide compound to the corresponding acid compound which can be readily removed from the preparation, thus providing a substantially pure polyamide or polymerized amide preparation. Preferably, the polyamide or polymerized amide is unaffected by the methods, i.e., substantially no loss of the polyamide or polymerized amide.

In one aspect, the methods, biofilters and kits of the invention are particularly suited for use to detoxify a mixture of nitrile compounds or mixture of nitrile and amide compounds in waste streams of nitrile production facilities. In this aspect, the methods and compositions of the invention are particularly advantageous in that the nitriles, at high concentration(s), are detoxified by a pure culture of an induced microorganism. In another aspect of the invention, the methods are particularly suited for use to remove nitrile compound(s) from amide preparations containing an unwanted nitrile compound. In this aspect, if the pure culture of induced microorganisms or extract thereof contains amidase activity, the pure culture or extract should be incubated at a temperature which inactivates any ability to convert an amide to acid but does not affect the ability of the microorganism or extract to convert a nitrile compound to an amide compound prior to use in the methods.

According to the present invention, once induced, the pure microorganism culture does not have to be actively dividing or even alive for the detoxification to occur. This decoupling of growth from detoxification allows for rapid detoxification of nitrile compounds under conditions inhibitory for growth; for example, under very high concentration(s) of nitrile compounds, highly alkaline or acid pH, high temperature, e.g., 55° C., etc. In addition, decoupling: (1) means that since cells need not be growing to detoxify, then cells (biomass) are not produced or their production is minimized, where cells are growing, it becomes necessary to deal with the waste biomass which is created; (2) because the cells are not growing, compounds which may not serve as growth substrates can be fortuitously detoxified; and (3) the process results in the production of less toxic or non-toxic intermediates which can easily be degraded in nature (reduction in recalcitrance as well as toxicity).

Further, since some nitrile or amide compounds are particularly refractory to bioremediation, the present invention allows for the detoxification of the nitriles to the corresponding amide and/or acid compounds or for the conversion of amides to acid compounds which are less refractory to bioremediation, thereby allowing for the successful bioremediation of refractive compounds.

The speed and efficiency afforded by the methods and compositions of the present invention have been never before achieved for the detoxification of nitrile compound(s).

3.1. Definitions

As used in this application, with respect to a nitrile compound, the term "detoxification" is intended to encompass conversion of a nitrile compound either to the corresponding amide or acid compound or a mixture thereof. For example, acrylonitrile is detoxified by conversion to acrylamide or to acrylic acid or a mixture thereof. As used in this application, with respect to an amide compound, the term "detoxification" is intended to encompass conversion of an amide compound to the corresponding acid compound. The acid can exist as a free acid or salt form if the acid is in the presence of a salt. The term "detoxification" is not meant to imply that the compound into which the nitrile or amide compound is converted is less toxic, (i.e., harmful to a living organism) than the nitrile or amide compound, although such compound may well be. In addition, the term "detoxification" is not intended to imply that the nitrile or amide compound is degraded to end products $CO_2$, $H_2O$ and biomass.

In a preferred embodiment, detoxification entails conversion of the nitrile and/or amide compounds to compounds which can be certified by the Environmental Protection Agency as less hazardous, and preferably as non-hazardous.

As used in this application, a "nitrile" compound is intended to encompass an organic compound containing one or more nitrile moieties, i.e., C≡N, and at least one carbon atom in addition to the C≡N moiety. As presently used, the term "nitrile" includes compounds like acrolein cyanohydrin. It is noted that acrolein in the presence of reactive cyanide exists in the form of acrolein cyanohydrin. The nitrile detoxifying microorganisms are capable of converting a nitrile which is a cyanohydrin to a corresponding acid. For example, acrolein cyanohydrin is converted to acrylic acid. As presently used, the term "nitrile" includes, but is not limited to, acetonitrile, acrylonitrile, fumaronitrile, succinonitrile, crotononitrile, adiponitrile, benzonitrile, butyronitrile, β-propriosulfononitrile, isovaleronitrile, valeronitrile, phenylnitrile, acrolein cyanohydrin, etc.

As used in this application, an "anionic" polyamide preparation is a polyamide preparation that contains an anionic main chain and/or side chain group(s) and has a net negative charge.

As used in this application, a "cationic" polyamide preparation is a polyamide preparation that contains a cationic main chain and/or side chain group(s) and has a net positive charge.

As used in this application, a "non-ionic" polyamide preparation is a polyamide preparation that either does not contain anionic and/or cationic main chain and/or side chain group(s), or if one or more such groups is present has a net neutral charge.

3.2 Objects of the Invention

It is an object of the present invention to provide an induced pure culture of a single microorganism which is able to detoxify a mixture of nitrile or nitrile and amide compounds to their corresponding amide or acid compounds without necessarily degrading (utilizing) the mixture of compounds. Further, this conversion can take place when the compounds present in the mixture are at high concentrations, such concentrations as those found in the wastewater stream of a nitrile, e.g., acrylonitrile, production plant. Further, the induced pure cultures are able to convert a broad range of nitrile (including dinitrile) and amide compounds simultaneously, not just one or two nitrile compounds individually.

It is also an object of the invention to provide methods for the use of such pure cultures to convert the mixture of compounds found in the wastewater stream of a nitrile production plant to compounds which may be more readily degraded in nature. One advantage of the present invention is that since the conversion of the mixture of compounds is not necessarily linked to growth, less biomass may be produced for subsequent disposal. Another advantage of the present invention is that the time required for the conversion of the compounds at high concentrations is on the order of minutes and hours.

It is another object of the present invention to provide methods for the use of the pure cultures to remove an unwanted nitrile compound from an amide preparation, such as an amide preparation which is being prepared in an amide production plant. The pure cultures are advantageously used to purify commercial grade amide preparations, such as acetamide or acrylamide, containing an unwanted nitrile compound by converting the nitrile to an acid moiety. This improves the purity and product yield of the amide being produced.

It is yet another object of the present invention to provide methods for the use of the pure cultures to convert a mixture of amide compounds to the corresponding acid compounds.

It is yet another object of the present invention to provide methods to remove an unwanted amide monomer from a polyamide preparation at a pH of about 2 to less than 6 by converting the amide monomer to the corresponding acid compound.

Other objects and/or advantages of the invention will be apparent to those skilled in the art.

4. BRIEF DESCRIPTION OF THE FIGURES

The present invention may be understood more fully by reference to the following detailed description of the invention, illustrative examples of specific embodiments of the invention and the appended figures in which:

FIG. 1 is a graph showing the effect of temperature on the rate of nitrile detoxification by *Rhodococcus rhodochrous* strain DAP 96622 over a temperature range of 25° C. to 80° C.

FIGS. 2A–2C are graphs showing the ability of *R. rhodochrous* strain DAP 96622 induced as taught herein to detoxify acetonitrile and acrylonitrile at different pH values. FIG. 2A, pH=6; FIG. 2B, pH=7; FIG. 2C, pH=8. See text, Section 8.2, for details.

FIG. 3 is a graph showing the ability of Rhodococcus sp. strain DAP 96253 induced as taught herein to detoxify a mixture of nitrile and amide compounds. See text, Section 9, for details.

5. DETAILED DESCRIPTION OF THE INVENTION

Figure 1:
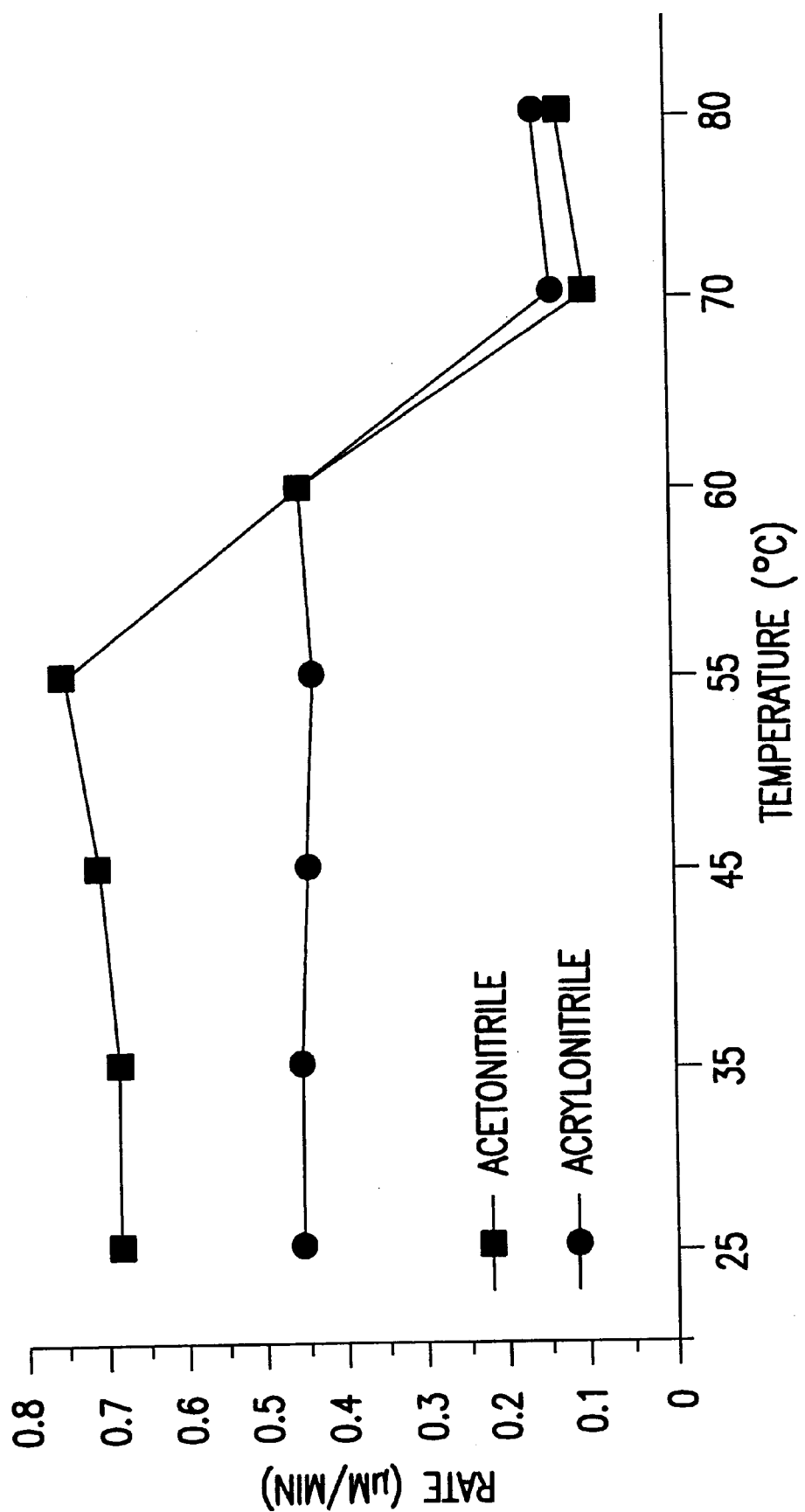

The present invention encompasses methods for the detoxification of a mixture of nitrile compounds, a mixture of nitrile and amide compounds or a mixture of amide compounds at high total concentration(s) by conversion of the nitrile compounds to the corresponding amide and/or acid compounds or by conversion of the amide compounds to the corresponding acid compounds using a pure culture of a single microorganism strain induced to be capable of converting the nitrile moieties to amide and/or acid moieties and/or the amide moieties to acid moieties. If the original mixture is a mixture of nitrile compounds and an amide is formed, the amide can be further converted, using the present methods, to the corresponding acid. The induced pure cultures are able to detoxify mixtures of nitrile compounds or mixtures of nitrile and amide compounds which are typically present, in high concentration(s), in nitrile production waste streams. The induced pure cultures are able to remove an unwanted nitrile compound from amide preparations containing the same which are produced by amide production plants. The induced pure cultures are able to convert mixtures of amide to the corresponding acid compounds.

Although not intending to be limited to any particular mechanism of conversion, it is believed the microorganisms capable of converting a nitrile to the corresponding amide contain nitrile hydratase enzyme activity; those capable of converting a nitrile to the corresponding acid contain either nitrile hydratase enzyme activity in combination with amidase enzyme activity or nitrilase enzyme activity.

Detoxification of a nitrile to the corresponding amide can be monitored by assessing the disappearance of the nitrile compound and/or the concurrent appearance of the amide compound by any method known to those of skill in the art, for example, using gas-liquid chromatography with a flame ionization detector (GLC-FID) to detect the amide and high pressure liquid chromatography (HPLC) to detect the acid compound. Detoxification to the corresponding acid results in stoichiometric production of ammonia for each nitrile or amide group originally present. The extent of detoxification of nitrile compounds or amide compounds can be monitored by measuring the release of ammonia using the technique of Fawcett and Scott, 1960, J. Clin. Pathol. 13:156–159. If ammonia release cannot be measured due to the presence of ammonia or an ammonium salt, the concentration of the nitrites and amides present can be monitored by methods known to those of skill in the art, including but not limited to, GLC-FID, etc. Alternatively, the disappearance of nitrile compounds can be measured by assessing the production of the corresponding acid compounds which can be monitored by derivatizing the acid compound and detecting the derivatized product using GLC-FID. Amides and acids can be derivatized for analysis by GLC-FID if first alkylated, esterified or silylated (see generally, Supelco Chromatography Products catalog, 1997, at pages 653–656 (Supelco Inc., Bellefonte Pa.).

The acid and other non-nitrile compounds can then, if desired, be further degraded to $CO_2$, $H_2O$ and biomass.

For clarity of disclosure, and not by way of limitation, the detailed description of the invention is divided into the following sub-sections:

(1) Methods for induction and identification of microorganism strains having nitrile and/or amide detoxification ability;

(2) Characterization of the isolated microorganism strains;

(3) Applications or methods of use of the induced microorganism strains for detoxification; and (4) Kits containing the useful induced microorganism strains.

5.1. Methods for Induction and Identification of Microorganism Strains Having Nitrile and/or Amide Detoxification Ability The present invention provides methods for the isolation and identification of useful microorganism strains by growing a strain in the presence of a mixture of nitrile compounds or a mixture of nitrile and amide compounds. Surprisingly it has been discovered that, in order to induce a broad nitrile or amide detoxifying ability, i.e., the ability to detoxify a variety of nitrites or amides, for example, nitrites having a single C≡N moiety, such as acetonitrile or acrylonitrile and dinitriles having two C≡N moieties, such as fumaronitrile and succinonitrile, the culture medium has to be supplemented with more than just one nitrile compound. More particularly, it has been discovered that the ability to detoxify a broad spectrum of nitriles and/or amides can be induced using a mixture of a limited number of nitrile compounds or a mixture of nitrile and amide compounds. In this manner the strains are "multiply induced". After multiple induction, the strains, in pure culture, are able to detoxify a mixture of a wide range of nitrile compounds, including nitriles having a single C≡N moiety, dinitriles, and compounds like acrolein cyanohydrin as well as a range of amide compounds. The microorganism strains selected to undergo induction are selected from known sources or can be newly isolated microorganisms, and can be thermophiles or other extremophiles, such as halophiles or acidophiles. Advantageously, the multiple induction methods do not require an aromatic nitrile, such as benzonitrile, but according to one embodiment the induced microorganisms have the ability to detoxify a mixture containing an aromatic nitrile.

It has been noted that microorganisms which can be multiply induced to have nitrile and/or amide detoxification activity appear to grow more slowly in media containing a nitrile or amide as the sole source of carbon or as the sole source of carbon and nitrogen when compared to growth in media containing an easily utilizable carbon source such as a carbohydrate, etc. In a preferred embodiment, a microorganism strain which can be multiply induced to have nitrile and/or amide detoxification activity is cultured in a medium which contains an easily utilizable source of carbon (such as glucose, maltose, sucrose, acetate, benzoate, etc.). The carbon and a nitrogen source are added incrementally or continuously such that the levels of carbon and nitrogen in the reactor are below 1%. In this manner large amounts of cells are produced quickly and cheaply. Once the desired cell mass has been achieved, then the microorganism is multiply induced according to the methods described in Section 5.1.1 or 5.1.2 below, for example, for the last 20 hours of a production cycle.

5.1.1. Induction Using Nitriles or Nitrile and Amide Compounds and Nutritionally Complete Medium According to one embodiment of the invention, a method for the induction of nitrile and/or amide detoxification activity is provided using nutritionally complete culture medium supplemented with a mixture of nitrile compounds or a mixture of nitrile and amide compounds. More particularly, the method of this embodiment comprises culturing a microorganism in a nutritionally complete medium supplemented with a mixture of nitrile compounds or a mixture of nitrile and amide compounds and collecting the cultured microorganisms. When cultured on agar plates, the microorganisms are cultured for about 24 to 48 hours in the presence of a mixture of nitrile compounds or a mixture of nitrile and amide compounds. When cultured in a fermentor, the microorganisms are cultured, in nutritionally complete medium, for 1 to 48+ hours, preferably 1 to 20 hours, more preferably 16 to 20 hours, prior to the addition of a mixture of nitrile compounds or mixture of nitrile and amide compounds; then harvested 4 to 5 hours after addition of the mixture of nitrile compounds or mixture of nitrile and amide compounds. If a larger biomass is desired, the microorganisms can be cultured in the fermentor for longer time periods prior to the addition of the mixture of nitrile compounds or the mixture of nitrile and amide compounds. As is known to those skilled in the art, additional nutrients can be added, as needed, to maintain growth.

In one mode of this embodiment, the microorganism is induced in nutritionally complete medium supplemented with a mixture of nitrile compounds. Useful mixtures of nitrile compounds include the following: acetonitrile at about 50 to about 500 ppm; acrylonitrile at about 50 to about 500 ppm; and succinonitrile at about 25 to about 100 ppm. Optionally, about 1–10 ppm KCN or NaCN may be added to the mixture. Although not intending to be limited to any particular mechanism, the inventor believes the presence of KCN or NaCN during induction acclimates the microorganisms to inorganic cyanide. Also optionally, cobalt at a concentration of about 1–25 ppm may be added to the mixture. Although not intending to be limited to any particular mechanism, the inventor believes cobalt replaces the iron atom in iron-containing nitrile hydratase enzymes and makes the nitrile hydratase resistant to cyanide(s). This is helpful if the mixture of nitrile compounds or mixture of nitrile and amide compounds to be detoxified is a nitrile production wastestream high in inorganic cyanide. Also optionally, urea at a concentration of about 1–10 g/l may be added to the mixture. The addition of either KCN, NaCN, cobalt or urea is not necessary for induction of detoxification activity.

Preferably, a nutritionally complete medium is supplemented with a mixture of nitrile compounds containing a mixture of at least one of acetonitrile and acrylonitrile at a concentration of about 150 ppm each and succinonitrile and fumaronitrile at a concentration of about 50 ppm each. More preferably, the nitrile mixture comprises acetonitrile and acrylonitrile at about 150 ppm each and succinonitrile at a concentration of about 50 ppm. Optionally, KCN and cobalt at a concentration of about 10 ppm each and urea at a concentration of about 7 g/l is added to the culture medium. Even more preferably, a nutritionally complete medium which is BACTO™ R2A medium (Difco, Detroit, Mich.) or YEMEA medium or a medium containing the ratio of components of YEMEA without agar is supplemented with acetonitrile and acrylonitrile at about 150 ppm each and succinonitrile at a concentration of about 50 ppm, KCN and cobalt at about 10 ppm each, and urea at about 7 g/l. In the preferred modes, acetonitrile and acrylonitrile together induce acetonitrile, acrylonitrile, succinonitrile and fumaronitrile detoxifying activities. The inclusion of succinonitrile in the culture medium appears to improve the rate of acetonitrile and acrylonitrile detoxification in mixtures in which succinonitrile and/or fumaronitrile is present. The addition of succinonitrile, however, appears to improve the detoxification of succinonitrile but has no effect on the detoxification of fumaronitrile.

In an alternative mode of this embodiment, the microorganism is induced in nutritionally complete medium supplemented with a mixture of nitrile and amide compounds. Useful mixtures of nitrile and amide compounds include the following: (1) at least one of succinonitrile at about 25 to 100 ppm, acetonitrile at about 50 to 150 ppm and acrylonitrile at about 50 to 150 ppm; and (2) acetamide at about 50 to 500 ppm and acrylamide at about 50 to 500 ppm. Optionally, KCN or NaCN can be added at about 1 to 10 ppm. Also optionally, cobalt can be added at about 1 to 25 ppm and urea can be added at about 1–10 g/l. Preferably, a nutritionally complete medium is supplemented with 50 ppm succinonitrile and acetamide and acrylamide at 150 ppm each.

Nutritionally complete medium is a growth medium which supplies the microorganism with all necessary nutrients required for its growth, e.g., carbon, and/or nitrogen. For example, and not by way of limitation, BACTO™ R2A medium (Difco, Detroit, Mich.) which contains glucose, peptone, $KH_2PO_4$, $MgSO_4$, casamino acids, yeast extract, soluble starch and sodium pyruvate is a suitable nutritionally complete medium. Another nutritionally complete medium for use in the present invention is YEMEA medium which contains glucose, malt extract and yeast extract without agar. Another nutritionally complete medium for use in the present invention is a nutritionally complete medium containing glucose, peptone, $KH_2PO_4$, $MgSO_4$, soluble starch and sodium pyruvate. The present invention encompasses the use of any nutritionally complete medium known to those skilled in the art.

The microorganism is cultured under conditions including pH between 3.0 and 11.0, preferably between about 6.0 and 8.0; and temperature between 4° C. and 55° C., preferably between about 15° C. and 37° C. Further, the dissolved oxygen tension should be between 0.1% and 100%, preferably between about 4% and 80%, more preferably between about 4% and 30%. The dissolved oxygen tension may be monitored and maintained in the desired range by supplying oxygen in the form of air, pure oxygen, peroxide, and/or other peroxy compositions which liberate oxygen.

At the end of the culture period, the cultured microorganisms are collected and concentrated, for example, by scraping, centrifuging, filtering, etc., or by any method known to those skilled in the art.

In one exemplary embodiment, cells are collected at 4° C., prepared as cell concentrates and then rapidly frozen (dry ice and acetone) and then stored at –20° C. or lower. Frozen cell concentrate can be used or it can be then immobilized.

The nitrile and/or amide detoxification activity of the collected microorganisms, once multiply induced according to the methods described above, can be stabilized by addition of one or more substrates to the cultured microorganism. Although not intending to be limited to any mechanism, the inventor notes that it is well known to those of skill in the art that nitrile hydratase and amidase enzymes are generally most stable when in the presence of a substrate. Thus, for example, addition of an amide compound, such as isobutyramide, or an acid, such as isobutyric acid, can stabilize a nitrile hydratase such that activity is retained for longer time periods.

Stabilization can also be achieved by immobilization of the induced microorganism in polyacrylamide or acrylamide cubes or in alginate which has been crosslinked with polyethylene imide. Preferably, cells are stabilized by immobilization in alginate cross-linked with polyethylene imide.

5.1.2. Induction Using Nitrile or Nitrile and Amide Compounds and Minimal Medium According to another embodiment of the invention, a method for the induction of nitrile-detoxification activity is provided using minimal culture medium supplemented with a mixture of nitrile compounds or a mixture of nitrile and amide compounds. More particularly, the method comprises culturing a microorganism in a minimal medium supplemented with a mixture of nitriles or a mixture of nitrile and amide compounds and collecting the cultured microorganisms. When cultured on agar plates, the microorganisms are cultured for about 24 to 48 hours. When cultured in a fermentor, the microorganisms are cultured in a minimal medium supplemented with a mixture of nitrile compounds or a mixture of nitrile and amide compounds for 1 to 48+ hours, preferably 1 to 20 hours, more preferably 16 to 23 hours; then harvested 4 to 5 hours after addition of the mixture of nitrile compounds or mixture of nitrile and amide compounds. If a larger biomass is desired the microorganisms can be cultured in the fermentor for longer time periods.

Useful mixtures of nitrile compounds include the following: acetonitrile at about 50 to about 500 ppm; acrylonitrile at about 50 to about 500 ppm; and succinonitrile at about 25 to about 100 ppm. optionally, 1–10 ppm KCN or NaCN may be added to the mixture. Although not intending to be limited to any particular mechanism, the inventor believes the presence of KCN or NaCN during induction acclimates the microorganisms to inorganic cyanide. Also optionally, cobalt at a concentration of about 1-25 ppm may be added to the mixture. Although not intending to be limited to any particular mechanism, the inventor believes cobalt replaces the iron atom in iron-containing nitrilase enzymes and makes the nitrile hydratase resistant to cyanide(s). This is helpful if the mixture of nitrile compounds or mixture of nitrile and amide compounds to be detoxified is a nitrile production wastestream high in inorganic cyanide. Also optionally, urea at a concentration of about 1–10 g/l may be added to the mixture. The addition of either KCN, NaCN, cobalt or urea is not necessary for induction of detoxification activity.

Preferably, the minimal medium is supplemented with a mixture of nitrile compounds containing at least one of acetonitrile and acrylonitrile at a concentration of about 150 ppm each and succinonitrile and fumaronitrile at a concentration of about 50 ppm each. More preferably, the nitrile mixture comprises acetonitrile and acrylonitrile at about 150 ppm each and succinonitrile at a concentration of about 50 ppm. Optionally, KCN and cobalt at a concentration of about 10 ppm each and urea at a concentration of about 7 g/l is added to the culture medium. In this preferred mode, acetonitrile and acrylonitrile together induce acetonitrile, acrylonitrile, succinonitrile and fumaronitrile detoxifying activities. The inclusion of succinonitrile in the medium appears to improve the rate of acetonitrile and acrylonitrile detoxification in mixtures in which succinonitrile is present. The addition of succinonitrile, however, appears to improve the detoxification of succinonitrile but has no effect on the detoxification of fumaronitrile.

In an alternative mode of this embodiment, the microorganism is induced in minimal medium supplemented with a mixture of nitrile and amide compounds. Useful mixtures of nitrile and amide compounds include the following: (1) at least one of succinonitrile at about 25 to 100 ppm, acetonitrile at about 50 to 150 ppm and acrylonitrile at about 50 to 150 ppm; and (2) acetamide at about 50 to 500 ppm and acrylamide at about 50 to 500 ppm. Optionally, KCN or NaCN can be added at about 1 to 10 ppm. Also optionally, cobalt can be added at about 1–25 ppm and urea can be added at about 1–10 g/l. Preferably, a minimal medium is supplemented with 50 ppm succinonitrile and acetamide and acrylamide at 150 ppm each.

Minimal medium is a nutritionally incomplete medium which does not supply the microorganism with organic carbon for its growth. Rather, the minimal medium must be supplemented with compounds which the microorganisms can use as a source of carbon and/or energy. For example, and not by way of limitation, Stanier's minimal medium (Stanier et al., 1966, J. Gen. Microbiol. 43:159–271) and phosphate buffered saline (PBS) are acceptable minimal media for use in the present invention.

The microorganism is cultured under conditions including pH between 3.0 and 11.0, preferably between about 6.0 and 8.0; and temperature between 4° C. and 55° C., preferably between about 15° C. and 37° C. Further, the dissolved oxygen tension should be between 0.1% and 100%, preferably between about 4% and 80%, more preferably between about 4% and 30%. The dissolved oxygen tension may be monitored and maintained in the desired range by supplying oxygen in the form of air, pure oxygen, peroxide, and/or other peroxy compositions which liberate oxygen.

At the end of the culture period, the cultured microorganisms are collected and concentrated, for example, by scraping, centrifuging, filtering, etc., or by any method known to those skilled in the art.

The nitrile and/or amide detoxification activity of the harvested microorganisms, once multiply induced according to the methods described above, can be stabilized by addition of one or more substrates to the cultured microorganism. Although not intending to be limited to any mechanism, the inventor notes that it is well known to those of skill in the art that nitrile hydratase and amidase enzymes are generally most stable when in the presence of a substrate. Thus, for example, addition of an amide compound, such as isobutyramide, or an acid, such as isobutyric acid, can stabilize a nitrile hydratase such that activity is retained for longer time periods.

Stabilization can also be achieved by immobilization of the induced microorganism in polyacrylamide or acrylamide cubes or in alginate which has been cross-linked with polyethylene imide. Preferably, cells are stabilized by immobilization in alginate cross-linked with polyethylene imide.

5.1.3. Identification of Useful Microorganisms

According to yet another embodiment, the present invention provides a method of screening microorganisms to identify and isolate microorganisms useful to detoxify mixtures of nitrile compounds, mixtures of nitrile and amide compounds, or mixtures of amide compounds. The method, in general, entails exposing a microorganism to be tested to the conditions, described above in Sections 5.1.1 and 5.1.2, which are used to multiply induce nitrile and/or amide detoxification ability and then assessing the ability of the putatively "induced" test microorganisms to detoxify a mixture of nitrile compounds, a mixture of nitrile and amide compounds, or a mixture of amide compounds.

The method to screen for microorganisms useful to detoxify a mixture of nitrile compounds or a mixture of nitrile and amide compounds, comprises culturing a test microorganism in a nutritionally complete or minimal medium supplemented with a first mixture of nitrile compounds (see Sections 5.1.1 and 5.1.2, above) for about 24 to 48 hours on agar plates under growth favorable conditions to obtain a putatively induced microorganism; and assessing the ability of the putatively induced microorganism to detoxify a mixture of nitriles by contacting said microorganism with a second mixture of nitriles comprising acrylonitrile at a concentration of about 1 ppm to about 20,000 ppm, acetonitrile at a concentration of about 1 ppm to about 20,000 ppm, fumaronitrile at a concentration of about 1 ppm to about 30,000 ppm, and succinonitrile at a concentration of about 1 ppm to about 40,000 ppm, and monitoring the disappearance of each of said nitrites in the mixture, wherein the disappearance of more than one nitrile compound in the mixture indicates that the test microorganism has the ability to detoxify a mixture of nitrile compounds or a mixture of nitrile and amide compounds. Preferably, the second mixture of nitriles comprises acrylonitrile, acetonitrile, fumaronitrile and succinonitrile at a concentration of about 50–250 ppm each and disappearance of all the nitrile compounds of the second mixture in about 30 minutes indicates that the test microorganism has the ability to detoxify a mixture of nitrile compounds or a mixture of nitrile and amide compounds. Most preferably, disappearance of all the nitrile compounds of the second mixture in about 10 minutes indicates that the microorganism has the desired ability. If it is desired that the microorganism have the ability to detoxify a mixture of nitriles or a mixture of nitrile and amide compounds in the presence of ammonium sulfate, ammonium sulfate is included in the second mixture at about 1–8% ammonium sulfate.

According to a preferred mode of this embodiment, the nutritionally complete or minimal medium is supplemented with a first mixture of nitrile compounds containing a mixture of at least one of acetonitrile and acrylonitrile at a concentration of about 150 ppm each and succinonitrile and fumaronitrile at a concentration of about 50 ppm each. More preferably, the first mixture of nitriles comprises acetonitrile and acrylonitrile at about 150 ppm each and succinonitrile at a concentration of about 50 ppm. Optionally, KCN at a concentration of about 10 ppm is added to the culture medium.

According to another preferred mode of this embodiment, the nutritionally complete or minimal medium is supplemented with a first mixture of nitrile and amide compounds (see Sections 5.1.1 and 5.1.2, above).

Useful nutritionally complete media and minimal media are described above in Sections 5.1.1 and 5.1.2. The test microorganism is cultured under conditions including pH between about 3.0 and 11.0, preferably between 6.0 and 8.0; and temperature between about 4° C. and 55° C., preferably between 15° C. and 37° C.

The extent of detoxification of nitrile compounds can be monitored by measuring the release of ammonia using the technique of Fawcett and Scott, 1960, J. Clin. Pathol. 13:156–159. If ammonia release cannot be measured due to the presence of ammonia or an ammonium salt, the concentration of the nitrites present in the second mixture can be monitored by methods known to those of skill in the art, including but not limited to, GLC-FID, etc, and the concentration of the acid compounds present can be monitored by derivatizing the acid compound and detecting the derivatized product using GLC-FID. Acids can be derivatized for analysis by GLC-FID if first alkylated, esterified or silylated (see generally, Supelco Chromatography Products catalog, 1997, at pages 653–656 (Supelco Inc., Bellefonte Pa.).

The method to screen for microorganisms useful to detoxify a mixture of amide compounds, comprises culturing, for about 24 to 48 hours on agar plates, a test microorganism in a nutritionally complete or minimal medium supplemented with a first mixture of nitrile and amide compounds under growth favorable conditions to obtain a putatively induced microorganism; and assessing the ability of the putatively induced microorganism to detoxify a mixture of amides by contacting said microorganism with a second mixture (of amides) comprising acetamide at a concentration of about 1 to 20,000 ppm and acrylamide at a concentration of about 1 to 20,000 ppm, and monitoring the disappearance of each of said amides in the mixture, wherein the disappearance of the amides in the second mixture indicates that the test microorganism has the ability to detoxify a mixture of amide compounds. Preferably, the second mixture comprises acetamide and acrylamide at 50–150 ppm each and disappearance of all of the amides in about 30 minutes indicates that the putatively induced microorganism has been induced to detoxify a mixture of amides and thus is a microorganism useful for the methods of detoxification according to the present invention. Most preferably, disappearance of all of the amides of the second mixture in about 10 minutes indicates that the microorganism has the desired ability. If it is desired that the microorganism have the ability to detoxify amide compounds in the presence of ammonium sulfate, ammonium sulfate is included in the second mixture at about 1–8% ammonium sulfate. Optionally, KCN can be added to the second mixture at about 10 ppm.

According to a preferred mode of this embodiment, the nutritionally complete or minimal medium is supplemented with a first mixture of nitrile and amide compounds containing a mixture of succinonitrile at about 50 ppm and acetamide and acrylamide at about 150 ppm each. Optionally, KCN at a concentration of about 10 ppm is added to the culture medium.

Useful nutritionally complete media and minimal media are described above in Sections 5.1.1 and 5.1.2. The test microorganism is cultured under conditions including pH between about 3.0 and 11.0, preferably between 6.0 and 8.0; and temperature between about 4° C. and 55° C., preferably between 15° C. and 37° C.

The extent of detoxification of amide compounds can be monitored by measuring the release of ammonia using the technique of Fawcett and Scott, 1960, J. Clin. Pathol. 13:156–159. If ammonia release cannot be measured due to the presence of ammonia or an ammonium salt, the concentration of the amides present can be monitored by methods known to those of skill in the art, including but not limited to, GLC-FID, etc, and the concentration of the acid compounds present can be monitored by derivatizing the acid compound and detecting the derivatized product using GLC-FID. Acids can be derivatized for analysis by GLC-FID if first alkylated, esterified or silylated (see generally, Supelco Chromatography Products catalog, 1997, at pages 653–656 (Supelco Inc., Bellefonte Pa.).

5.2. Characterization of Microorganism Strains

The microorganism strains, described below, isolated or obtained from known sources have been discovered to have the ability to detoxify a mixture of nitrile compounds or a mixture of nitrile and amide compounds or a mixture of amide compounds to the corresponding amide and/or acid compounds after multiple induction according to the present invention as described above in Section 5.1.

Tables I and II below present certain specific strain characteristics of two Rhodococcus strains, DAP 96622 and DAP 96253, derived from two strains obtained from the American Type Culture Collection, Rockville, Md., ATCC Accession No. 33278 and ATCC Accession No. 39484, respectively, and which were discovered to have the ability to detoxify a mixture of nitrile compounds or a mixture of nitrile and amide compounds or a mixture of amide compounds to the corresponding amide and/or acid compounds after multiple induction according to the invention. In one illustrative example, the two Rhodococcus strains were multiply induced using 150 ppm each of acrylonitrile, acetonitrile, and 50 ppm of succinonitrile with or without 50 ppm KCN.

Carbohydrate utilization tests were performed using protocols described in *Manual of Methods for General Bacteriology*, 1981, Philip Gerhardt, ed., Am. Soc. Microbiol., Washington, D.C. Nitrile utilization tests were performed after the strains were induced by culturing the microorganism on a nutritionally complete medium supplemented with 150 ppm each of acetonitrile and acrylonitrile and 50 ppm succinonitrile. The actual utilization test was performed in a minimal medium supplemented with a particular test compound(s) as a sole source of carbon and/or energy.

TABLE I

*Rhodococcus rhodochrous* strain DAP 96622

| DIFFERENTIAL CHARACTERISTIC | RESULT |
| --- | --- |
| CATALASE/OXIDASE | (+)/(−) |
| CITRATE UTILIZATION | (+) |
| TRIPLE SUGAR IRON AGAR | no change |
| GROWTH AT | |
| 5° C. | (−) |
| 25° C. | (+) |
| 35° C. | (+) |
| 45° C. | (+) |
| UTILIZATION OF | |
| GLUCOSE | (+) |
| SUCROSE | (+) |
| FRUCTOSE | (+) |
| LACTOSE | (+) |
| MANNITOL | (+) |
| MANNOSE | (+) |
| ARABINOSE | (−) |
| INOSITOL | (+), No gas |
| RHAMNOSE | (+), No gas |
| UREASE | (+) |
| NITRATE REDUCTION | (−) |
| GELATIN HYDROLYSIS | (−) |

TABLE I-continued

Rhodococcus rhodochrous strain DAP 96622

| DIFFERENTIAL CHARACTERISTIC | | | RESULT |
|---|---|---|---|
| ANTIBIOTIC RESISTANCE | | | |
| GENTAMICIN | | | S |
| ERYTHROMYCIN | | | S |
| STREPTOMYCIN | | | S |
| TOBRAMYCIN | | | S |
| RIFAMPIN | | | S |
| PENICILLIN | | | S |
| TETRACYCLINE | | | S |
| UTILIZATION OF CARBON AND NITROGEN | | | |
| Stanier's minimal medium with nitrile as the sole carbon and nitrogen source | | | |
| ACRYLONITRILE | | (150 ppm/300 ppm) | (+)/(+) |
| ACETONITRILE | | (150 ppm/300 ppm) | (+)/(+) |
| SUCCINONITRILE | | (150 ppm/300 ppm) | (+)/(+) |
| FUMARONITRILE | | (150 ppm/300 ppm) | (+)/(+) |
| ACRYLONITRILE/ACETONITRILE/SUCCINONITRILE | | (150/300 ppm ea) | (+)/(+) |
| ACRYLONITRILE/ACETONITRILE/FUMARONITRILE | | (150/300 ppm ea) | (+)/(−) |
| ACRYLONITRILE/ACETONITRILE/SUCCINONITRILE/FUMARONITRILE | | (150/300 ppm ea) | (−)/(−) |
| UTILIZATION OF CARBON SOURCES | | | |
| Stanier's minimal medium containing 1 g/l ammonium sulfate | | | |
| P-CRESOL | (150/300 ppm) | (+)/(+) | |
| TOLUENE | (150/300 ppm) | (NT)/(NT) | |
| STYRENE | (150/300 ppm) | (NT)/(NT) | |
| TOLUENE/STYRENE | (150/300 ppm ea.) | (NT)/(NT) | |
| ACETATE | (150/300 ppm) | (+)/(+) | |
| ACRYLATE | (150/300 ppm) | (+)/(+) | |
| SUCCINATE | (150/300 ppm) | (+)/(+) | |
| FUMARATE | (150/300 ppm) | (+)/(+) | |
| UTILIZATION OF CARBON SOURCES | | | |
| Stanier's minimal medium containing 1 g/l ammonium sulfate but with 10 ppm KCN | | | |
| FUMARONITRILE | (150/300 ppm) | (+)/(+) | |
| SUCCINONITRILE | (150/300 ppm) | (+)/(+) | |
| UTILIZATION OF CARBON SOURCES | | | |
| Stanier's minimal medium without ammonium sulfate but with 10 ppm KCN | | | |
| FUMARONITRILE | (150/300 ppm) | (+)/(+) | |
| SUCCINONITRILE | (150/300 ppm) | (+)/(+) | |

TABLE II

Rhodococcus sp. strain DAP 96253

| DIFFERENTIAL CHARACTERISTIC | RESULT |
|---|---|
| CATALASE/OXIDASE | (+)/(−) |
| CITRATE UTILIZATION | (+) |
| TRIPLE SUGAR IRON AGAR | no change |
| GROWTH AT | |
| 5° C. | (−) |
| 25° C. | (+) |
| 35° C. | (+) |
| 45° C. | (+) |
| UTILIZATION OF | |
| GLUCOSE | (+) |
| SUCROSE | (+) |
| FRUCTOSE | (+) |
| LACTOSE | (+) |
| MANNITOL | (+) |
| MANNOSE | (+) |
| ARABINOSE | (−) |
| INOSITOL | (+), No gas |
| RHAMNOSE | (+), No gas |
| UREASE | (−) |
| NITRATE REDUCTION | (−) |
| GELATIN HYDROLYSIS | (−) |

TABLE II-continued

Rhodococcus sp. strain DAP 96253

| DIFFERENTIAL CHARACTERISTIC | RESULT |
|---|---|
| ANTIBIOTIC RESISTANCE | |
| GENTAMICIN | I* |
| ERYTHROMYCIN | S |
| STREPTOMYCIN | S |
| TOBRAMYCIN | S |
| RIFAMPIN | S |
| PENICILLIN | S |
| TETRACYCLINE | S |

*I means "intermediate" between sensitive and resistant.

UTILIZATION OF CARBON AND NITROGEN

Stanier's minimal medium with nitrile as the sole carbon and nitrogen source

| | | |
|---|---|---|
| ACRYLONITRILE | (150 ppm/300 ppm) | (+)/(+) |
| ACETONITRILE | (150 ppm/300 ppm) | (+)/(+) |
| SUCCINONITRILE | (150 ppm/300 ppm) | (+)/(−) |
| FUMARONITRILE | (150 ppm/300 ppm) | (+)/(−) |
| ACRYLONITRILE/ACETONITRILE/SUCCINONITRILE | (150/300 ppm ea) | (+)/(+) |
| ACRYLONITRILE/ACETONITRILE/FUMARONITRILE | (150/300 ppm ea) | (−)/(−) |
| ACRYLONITRILE/ACETONITRILE/SUCCINONITRILE/FUMARONITRILE | (150/300 ppm ea) | (−)/(−) |

UTILIZATION OF CARBON SOURCES

Stanier's minimal medium containing 1 g/l ammonium sulfate

| | | | |
|---|---|---|---|
| | P-CRESOL | (150/300 ppm) | (+)/(+) |
| | TOLUENE | (150/300 ppm) | (+)/(+) |
| | STYRENE | (150/300 ppm) | (+)/(+) |
| | TOLUENE/STYRENE | (150/300 ppm ea.) | (+)/(+) |
| | ACETATE | (150/300 ppm) | (+)/(+) |
| | ACRYLATE | (150/300 ppm) | (+)/(+) |
| | SUCCINATE | (150/300 ppm) | (+)/(+) |
| | FUMARATE | (150/300 ppm) | (+)/(+) |

UTILIZATION OF CARBON SOURCES

Stanier's minimal medium containing 1 g/l ammonium sulfate but with 10 ppm KCN

| | | | |
|---|---|---|---|
| | FUMARONITRILE | (150/300 ppm) | (+)/(+) |
| | SUCCINONITRILE | (150/300 ppm) | (+)/(+) |

UTILIZATION OF CARBON SOURCES

Stanier's minimal medium without ammonium sulfate but with 10 ppm KCN

| | | | |
|---|---|---|---|
| | FUMARONITRILE | (150/300 ppm) | (+)/(+) |
| | SUCCINONITRILE | (150/300 ppm) | (+)/(+) |

The following microorganism strains, characterized in the tables below, have been discovered to have the ability to detoxify a mixture of nitrile compounds, or a mixture of nitrile and amide compounds, and/or a mixture of amides to the corresponding amide and/or acid compounds after multiple induction according to the present invention. The isolation of these microorganisms is described in WO96/18724. Briefly, over 200 separate pure microorganism isolates were cultured from contaminated soil at the same industrial site. All of these pure isolates were combined and cultured, aerobically, with a sludge/waste material containing a mixture of aromatic, nitro-aromatic, halo-aromatic, aliphatic and halo-aliphatic compounds. A mixed culture of microorganisms was recovered from the cultured material and has been maintained on BACTO™ R2A medium (Difco, Detroit, Mich.).

The mixed culture designated DAP-2, which was deposited with the American Type Culture Collection and assigned ATCC Accession No. 55644, aerobically degrades at least the following compounds or mixtures thereof: benzene, toluene, xylene, ethylbenzene, naphthalene, chlorobenzene, phenol, cresol, nitrobenzene, aniline, anthracene, dimethylphenol, styrene, halonaphthalene, 2-, 3- or 4-chlorotoluene, 2-, 3- or 4-chlorobenzoate, 1,3-dichlorobenzoate, 1,2-, 1,3- or 1,4-dinitrobenzene, 1-chloro-3-nitrobenzene, 1-chloro-4-nitrobenzene, 1- or 2-methylnaphthalene, pyrene, acenaphthylene, fluoranthene, phenanthrene, benzo-(b)-fluoranthene, dibenzofuran, chrysene, catechol, m-toluic acid, cinnamyl acetate, vanillin, trans-cinnamaldehyde, mesitylene, salicylate, melamine, cyanuric acid, δ-(−)-limonene, hexadecane, methanol, formaldehyde, and chloroform.

The following pure cultures were isolated and characterized from the mixed culture designated DAP 2 by isolating single colonies on BACTO™ R2A medium supplemented with 150 ppm each of nitrobenzene, naphthalene, and toluene.

Microorganism DAP 623:

DAP 623 is a Gram negative motile rod, generally small single rods, though some pairs are seen. Staining can be uneven and there is some floc formation. The colonies appear white to creamy on BACTO™ R2A medium. In addition, this organism can utilize the following: mesitylene, lactate, succinate, limonene, m-toluic acid, chlorobenzene, salicylate, 2-, 3-, and 4-chlorotoluene, 2-, 3-, and 4-chlorobenzoic acid, and 1,3-dichlorobenzene as a sole source of carbon and energy. DAP 623 was deposited with the American Type Culture Collection and assigned ATCC Accession No. 55722 and is further characterized as shown in Table III.

TABLE III

DAP 623

| DIFFERENTIAL CHARACTERISTIC | RESULT |
| --- | --- |
| CATALASE/OXIDASE | (+)/(−) |
| CITRATE UTILIZATION | (+) |
| TRIPLE SUGAR IRON AGAR | acid from glucose |
| GROWTH AT | |
| 15° C. | (+) |
| 25° C. | (+) |
| 35° C. | (+) |
| 41° C. | (+) |
| UTILIZATION OF | |
| GLUCOSE | (+) |
| FRUCTOSE | (+) |
| LACTOSE | (−) |
| MANNITOL | (+) |
| MANNOSE | (+) |
| 2-METHYLNAPHTHALENE | (−) |
| α-KETOGLUTARATE | (+) |
| GLUTAMATE | (+) |
| ETHANOL | (−) |
| HEXADECANE | (−) |
| $NO_3 \rightarrow NO_2$ | (+) |
| ARGININE DECARBOXYLASE | (+) |
| LYSINE DECARBOXYLASE | (+) |
| ORNITHINE DECARBOXYLASE | (+) |
| GELATIN HYDROLYSIS | (+) |
| UREASE | (+) |
| ANTIBIOTIC RESISTANCE | |
| $HgCl_2$ | (−) |
| AMPICILLIN | R |
| KANAMYCIN | (−) |
| TETRACYCLINE | R |
| SPECTINOMYCIN | R |
| STREPTOMYCIN | (−) |

Microorganism DAP 626:

DAP 626 is a Gram variable rod which vary in size and occur singly and in pairs. Growth on flagella plates is seen which indicates flagellar motility. In addition, this organism can utilize the following: mesitylene, lactate, succinate, limonene, cinnamyl acetate, catechol, m-toluic acid, chlorobenzene, 2-, 3-, and 4-chlorotoluene, 2-, 3-, and 4-chlorobenzoic acid, and 1,3-dichlorobenzene as a sole source of carbon and energy. DAP 626 was deposited with the American Type Culture Collection and assigned ATCC Accession No. 55723 and is further characterized as shown in Table IV.

TABLE IV

DAP 626

| DIFFERENTIAL CHARACTERISTIC | RESULT |
| --- | --- |
| CATALASE/OXIDASE | (+)/(+) |
| CITRATE UTILIZATION | (−) |
| TRIPLE SUGAR IRON AGAR | $H_2S$ is produced |
| GROWTH AT | |
| 15° C. | (+) |
| 25° C. | (+) |
| 35° C. | (+) |
| 41° C. | (+) |
| UTILIZATION OF | |
| GLUCOSE | (−) |
| FRUCTOSE | (+) |
| LACTOSE | (−) |
| MANNITOL | (+) |

TABLE IV-continued

DAP 626

| DIFFERENTIAL CHARACTERISTIC | RESULT |
| --- | --- |
| MANNOSE | (−) |
| 2-METHYLNAPHTHALENE | (−) |
| α-KETOGLUTARATE | (+) |
| GLUTARATE | (+) |
| ETHANOL | (+) |
| HEXADECANE | (+) |
| $NO_3 \rightarrow NO_2$ | (−) |
| ARGININE DECARBOXYLASE | (−) |
| LYSINE DECARBOXYLASE | (−) |
| ORNITHINE DECARBOXYLASE | (−) |
| GELATIN HYDROLYSIS | (−) |
| UREASE | (+) |
| ANTIBIOTIC RESISTANCE | |
| $HgCl_2$ | (−) |
| AMPICILLIN | R |
| KANAMYCIN | (−) |
| SPECTINOMYCIN | (−) |
| STREPTOMYCIN | R |

Microorganism DAP 629:

DAP 629 is a Gram negative small motile rod, almost cocco-bacillary. Colonies appeared white with a slight fluorescence when grown on BACTO™ R2A agar. In addition, this organism can utilize the following: fluoranthrene, mesitylene, lactate, succinate, limonene, m-toluic acid, chlorobenzene, 2-, 3-, and 4-chlorotoluene, 2-, 3-, and 4-chlorobenzoic acid, and 1,3-dichlorobenzene as a sole source of carbon and energy. DAP 629 was deposited with the American Type Culture Collection and assigned ATCC Accession No. 55726 and is further characterized as shown in Table V.

TABLE V

DAP 629

| DIFFERENTIAL CHARACTERISTIC | RESULT |
| --- | --- |
| CATALASE/OXIDASE | (+)/(+) |
| CITRATE UTILIZATION | (−) |
| TRIPLE SUGAR IRON AGAR | no fermentation |
| GROWTH AT | |
| 15° C. | (+) |
| 25° C. | (+) |
| 35° C. | (+) |
| 41° C. | (−) |
| UTILIZATION OF | |
| GLUCOSE | (+) |
| FRUCTOSE | (−) |
| LACTOSE | (−) |
| MANNITOL | (−) |
| MANNOSE | (−) |
| 2-METHYLNAPHTHALENE | (−) |
| α-KETOGLUTARATE | (+) |
| GLUTAMATE | (+) |
| ETHANOL | (−) |
| HEXADECANE | (−) |
| $NO_3 \rightarrow NO_2$ | (+) |
| ARGININE DECARBOXYLASE | (−) |
| LYSINE DECARBOXYLASE | (+) |
| ORNITHINE DECARBOXYLASE | (−) |
| GELATIN HYDROLYSIS | (+) |
| UREASE | (−) |
| ANTIBIOTIC RESISTANCE | |
| $HgCl_2$ | (−) |
| AMPICILLIN | R |

TABLE V-continued

DAP 629

| DIFFERENTIAL CHARACTERISTIC | RESULT |
|---|---|
| KANAMYCIN | (−) |
| TETRACYCLINE | (−) |
| SPECTINOMYCIN | (−) |
| STREPTOMYCIN | (−) |

Microorganism DAP 632:

DAP 632 is a Gram variable motile slender rod, seen both singly and in pairs. Colonies appeared creamy to yellowish when grown on BACTO™ R2A agar. In addition, this organism can utilize the following: fluoranthrene, acenaphthalene, mesitylene, lactate, limonene, m-toluic acid, chlorobenzene, 2-, 3-, and 4-chlorotoluene, 2-, 3-, and 4-chlorobenzoic acid, and 1,3-dichlorobenzene as a sole source of carbon and energy. DAP 632 was deposited with the American Type Culture Collection and assigned ATCC Accession No. 55727 and is further characterized as shown in Table VI.

TABLE VI

DAP 632

| DIFFERENTIAL CHARACTERISTIC | RESULT |
|---|---|
| CATALASE/OXIDASE | (+)/(−) |
| CITRATE UTILIZATION | (+) |
| TRIPLE SUGAR IRON AGAR | no fermentation |
| GROWTH AT | |
| 15° C. | (+) |
| 25° C. | (+) |
| 35° C. | (+) |
| 41° C. | (+) |
| UTILIZATION OF | |
| GLUCOSE | (−) |
| FRUCTOSE | (−) |
| LACTOSE | (−) |
| MANNITOL | (−) |
| MANNOSE | (−) |
| 2-METHYLNAPHTHALENE | (−) |
| α-KETOGLUTARATE | (−) |
| GLUTAMATE | (+) |
| ETHANOL | (−) |
| HEXADECANE | (−) |
| $NO_3 \rightarrow NO_2$ | (−) |
| ARGININE DECARBOXYLASE | (−) |
| LYSINE DECARBOXYLASE | (−) |
| ORNITHINE DECARBOXYLASE | (−) |
| GELATIN HYDROLYSIS | (+) |
| UREASE | (+) |
| ANTIBIOTIC RESISTANCE | |
| $HgCl_2$ | R |
| AMPICILLIN | R |
| KANAMYCIN | R |
| TETRACYCLINE | R |
| SPECTINOMYCIN | R |
| STREPTOMYCIN | R |

Microorganism DAP 115:

DAP 115 is a Gram negative motile rod. Growth is observed on flagella plates, indicating motility is flagellar. Colonies appeared white when grown on BACTO™ R2A agar, but appear yellow in nutrient broth. In addition, this organism can utilize the following: benzo-(b)-fluoranthrene, fluoranthrene, dibenzofuran, acenaphthalene, salicylate, lactate, succinate, glyoxylate, mesitylene, vanillin, limonene, cinnamyl acetate, catechol, m-toluic acid, chlorobenzene, 2-, 3-, and 4-chlorotoluene, 2-, 3-, and 4-chlorobenzoic acid, and 1,3-dichlorobenzene as a sole source of carbon and energy. DAP 115 was deposited with the American Type Culture Collection and assigned ATCC Accession No. 55724 and is further characterized as shown in Table VII.

TABLE VII

DAP 115

| DIFFERENTIAL CHARACTERISTIC | RESULT |
|---|---|
| CATALASE/OXIDASE | (+)/(+) |
| CITRATE UTILIZATION | (+) |
| TRIPLE SUGAR IRON AGAR | $H_2S$ is produced acid and gas from glucose |
| GROWTH AT | |
| 15° C. | (+)/(−) |
| 25° C. | (+) |
| 35° C. | (+) |
| 41° C. | (+) |
| UTILIZATION OF | |
| GLUCOSE | (+) |
| FRUCTOSE | (+) |
| LACTOSE | (−) |
| MANNITOL | (+) |
| MANNOSE | (+) |
| 2-METHYLNAPHTHALENE | (+) |
| α-KETOGLUTARATE | (+) |
| GLUTAMATE | (+) |
| ETHANOL | (−) |
| HEXADECANE | (+) |
| $NO_3 \rightarrow NO_2$ | (+) |
| ARGININE DECARBOXYLASE | (−) |
| LYSINE DECARBOXYLASE | (−) |
| ORNITHINE DECARBOXYLASE | (+) |
| GELATIN HYDROLYSIS | (+) |
| UREASE | (+) |
| ANTIBIOTIC RESISTANCE | |
| $HgCl_2$ | R |
| AMPICILLIN | R |
| KANAMYCIN | R |
| TETRACYCLINE | R |
| SPECTINOMYCIN | R |
| STREPTOMYCIN | R |

Microorganism DAP 120:

DAP 120 is a Gram negative motile rod. Growth is observed on flagella plates, indicating motility is flagellar. In addition, this organism can utilize the following: chrysene, pyrene, lactate, succinate, glyoxylate, salicylate, mesitylene, vanillin, limonene, cinnamyl acetate, catechol, m-toluic acid, chlorobenzene, 2-, 3-, and 4-chlorotoluene, 2-, 3-, and 4-chlorobenzoic acid, and 1,3-dichlorobenzene as a sole source of carbon and energy. DAP 120 was deposited with the American Type Culture Collection and assigned ATCC Accession No. 55725 and is further characterized as shown in Table VIII.

TABLE VIII

DAP 120

| DIFFERENTIAL CHARACTERISTIC | RESULT |
|---|---|
| CATALASE/OXIDASE | (+)/(+) |
| CITRATE UTILIZATION | (+) |
| TRIPLE SUGAR IRON AGAR | $H_2S$ is produced |

TABLE VIII-continued

DAP 120

| DIFFERENTIAL CHARACTERISTIC | RESULT |
|---|---|
| GROWTH AT | |
| 15° C. | (+) |
| 25° C. | (+) |
| 35° C. | (+) |
| 41° C. | (+) |
| UTILIZATION OF | |
| GLUCOSE | (+) |
| FRUCTOSE | (+) |
| LACTOSE | (−) |
| MANNITOL | (+) |
| MANNOSE | (−) |
| 2-METHYLNAPHTHALENE | (+) |
| α-KETOGLUTARATE | (+) |
| GLUTAMATE | (+) |
| ETHANOL | (−) |
| HEXADECANE | (+) |
| $NO_3 \rightarrow NO_2$ | (+) |
| ARGININE DECARBOXYLASE | (−) |
| LYSINE DECARBOXYLASE | (−) |
| ORNITHINE DECARBOXYLASE | (−) |
| GELATIN HYDROLYSIS | (+) |
| UREASE | (+) |
| ANTIBIOTIC RESISTANCE | |
| $HgCl_2$ | R |
| AMPICILLIN | R |
| KANAMYCIN | R |
| TETRACYCLINE | R |
| SPECTINOMYCIN | (−) |
| STREPTOMYCIN | (−) |

Table IX below shows that the above-characterized pure cultures, isolated from the mixed culture designated DAP 2, are able to grow on Stanier's minimal medium supplemented solely with 150 ppm each of acetonitrile and acrylonitrile. The cultures were grown at 25–27° C., colony size determined after 14 days. Values represent mean of five replicate colonies for each determination.

TABLE IX

UTILIZATION OP ACETO- AND ACRYLONITRILE

| CULTURE | GROWTH* | COLONY SIZE |
|---|---|---|
| DAP 626 | +++ | 5.3 mm |
| DAP 115 | +++ | 6.3 mm |
| DAP 632 | +++ | 6.2 mm |
| DAP 623 | +++ | 5.0 mm |
| DAP 120 | +/++[a] | a |
| DAP 629 | +++ | 5.3 mm |

*Growth scored as ++++ luxuriant, +++ good, ++ fair, + modest, +/− scant, − no growth
[a]Growth of strain DAP 120 was very thin but rapidly spreading, therefore, precise quantitation was not possible.

As demonstrated in Table IX, the strains are able to utilize acetonitrile and acrylonitrile as sole sources of carbon and nitrogen.

5.3. Applications or Methods of Use of the Microorganisms for Detoxification of Nitriles and/or Amides According to one embodiment of the present invention, a method for the detoxification of a mixture of nitrile compounds or a mixture of nitrile and amide compounds comprises contacting a pure culture of a useful microorganism strain, multiply induced in accordance with the present invention, with a mixture of nitrile compounds or a mixture of nitrile and amide compounds for a sufficient amount of time to convert the nitrites to the corresponding amides. Alternatively, the method comprises contacting a pure culture of a multiply induced microorganism with a mixture of nitrile compounds or mixture of nitrile and amide compounds for a sufficient amount of time to convert the nitrile(s) and amide(s) to the corresponding acid(s).

According to another embodiment of the present invention, a method for the detoxification of a mixture of amide compounds comprises contacting a pure culture of a useful microorganism strain, multiply induced in accordance with the present invention, with a mixture of amide compounds for a sufficient amount of time to convert the amide compounds to the corresponding acid compounds.

The microorganism strain can be growing, i.e., actively dividing or may be resting, i.e., not actively dividing or not alive. When the method entails use of an actively growing culture of microorganisms, conditions for contact with a mixture of nitrile compounds or a mixture of nitrile and amide compounds or a mixture of amide compounds should be such that bacterial growth is supported. Such conditions include, for example, pH between 3.0 and 11.0, preferably between about 6.0 and 8.0; temperature between 4° C. and 55° C., preferably between about 15° C. and 37° C.; dissolved oxygen tension between 0.1% and 100%, preferably between about 4% and 80%, more preferably between 4% and 40% of saturation where the oxygen can be supplied by use of an oxygen containing or oxygen liberating composition. The oxygen containing or oxygen liberating composition can be air, pure oxygen, peroxide, or other peroxy chemicals which liberate oxygen or mixtures thereof. Further, the culture medium may be stirred or may not be stirred, provided with positive dissolved oxygen tension or not.

When the method entails use of a culture of microorganisms which are not actively dividing, conditions for contact with a mixture of nitrile compounds or a mixture of nitrile and amide compounds or a mixture of amide compounds should be such that nitrile and/or amide detoxifying (enzymatic) activities are supported. For example, temperature is maintained between about 0° C. and 65° C., preferably between about 4° C. and 55° C., more preferably between about 25° C. and 55° C. The pH can be alkaline or acid and is optimally maintained in the range of about pH 6 to 8. This particular embodiment is possible because detoxification is not growth dependent, i.e., once the nitrile and/or amide detoxifying activity is induced, the microorganism no longer needs to grow to detoxify. This particular mode can be carried out under anaerobic conditions.

The pure culture of a microorganism strain can be encapsulated or immobilized rather than free-swimming to permit collection and reuse after detoxification. In a preferred embodiment, the microorganism strain is immobilized. The pure culture can be immobilized by sorption, electrostatic bonding, covalent bonding, etc., onto a solid support which aids in the recovery of the microorganisms from the detoxification reaction mixture. Suitable solid supports include, but are not limited to granular activated carbon, compost, wood residue products, (e.g., wood chips, nuggets, shredded pallets or trees), alumina, ruthenium, iron oxide, ion exchange resins, (e.g., Amberlite™ IRA-93 or IRA-96 (Rohm & Haas), DOWEX™ (Dow Chemical Co, Inc.), DEAE cellulose, DEAE-SEPHADEX™ (Pharmacia, Inc.), ceramic beads, cross-linked polyacrylamide beads or cubes or other gel forms, alginate beads, κ-carrageenan cubes as well as solid particles that can be recovered from the aqueous solutions due to inherent magnetic ability. The alginate beads can be $Ca^{++}$ alginate beads or hardened alginate beads. The κ-carrageenan cubes can be hardened κ-carrageenan cubes. As an illustrative example, a pure culture of an induced microorganism can be mixed with a sodium alginate solution and calcium chloride to immobilize the microorganisms in alginate beads. In a preferred embodiment, the induced microorganism is immobilized in alginate beads that have been cross-linked with polyethylene imide or immobilized in a polyacrylamide-type polymer.

According to another embodiment of the present invention, a method for the detoxification of a mixture of nitrile compounds or a mixture of nitrile and amide compounds comprises contacting an extract of a pure culture of a useful microorganism strain, multiply induced according to the present invention, with a mixture of nitrile compounds or a mixture of nitrile and amide compounds for a sufficient amount of time to convert the nitrile(s) to the corresponding acid(s). Alternatively, the method comprises contacting an extract of a pure culture of a multiply induced microorganism with a mixture of nitrile compounds or a mixture of nitrile and amide compounds for a sufficient amount of time to convert the nitrile and amide compounds to the corresponding acids. Preferably, the extract is a crude extract of an individual microorganism. Extracts of the microorganism are prepared by methods known to those skilled in the art including, but not limited to the following: The cells of a sample of a pure culture of an induced microorganism are disrupted, for example, by sonication, by crushing, employing a French press, etc., to produce a cell lysate. The lysate is filtered or centrifuged to remove cellular debris and unlysed cells to yield a crude extract. The lysate can also be immobilized as described above for whole cells or immobilized using techniques known for use with immobilization of enzymes.

According to yet another embodiment of the present invention, a method for the detoxification of a mixture of amide compounds comprises contacting an extract of a pure culture of a useful microorganism strain, multiply induced according to the present invention, with a mixture of amide compounds for a sufficient amount of time to convert the amides to the corresponding acids. Preferably, the extract is a crude extract of an individual microorganism. Extracts of the microorganism are prepared by methods known to those skilled in the art including, but not limited to the following: The cells of a sample of a pure culture of an induced microorganism are disrupted, for example, by sonication, by crushing, employing a French press, etc., to produce a cell lysate. The lysate is filtered or centrifuged to remove cellular debris and unlysed cells to yield a crude extract.

Preferably, a pure culture or an extract of a microorganism, described in detail above in Section 5.2, induced according to the present invention is employed in the ethods of the invention. Alternatively, a pure culture or an extract of a microorganism capable of detoxifying a mixture of nitrile compounds or a mixture of nitrile and amide compounds or a mixture of amide compounds, which has been identified using the screening method(s) described above in Section 5.1.3 is employed in the methods of the invention.

The methods of the present invention can further comprise monitoring conversion of the nitrile compound and/or the concurrent appearance of the amide compound by any method known to those of skill in the art, for example, GLC-FID to detect the amide and HPLC to detect the acid compound. Detoxification to the corresponding acid results in stoichiometric production of ammonia for each nitrile or amide group originally present. The extent of detoxification of nitrile compounds or amide compounds can be monitored by measuring the release of ammonia using the technique of Fawcett and Scott, 1960, J. Clin. Pathol. 13:156–159. If ammonia release cannot be measured due to the presence of ammonia or an ammonium salt, the concentration of the nitriles and amides present can be monitored by methods known to those of skill in the art, including but not limited to, GLC-FID, etc. Alternatively, the disappearance of nitrile compounds can be measured by assessing the production of the corresponding acid compounds which can be monitored by derivatizing the acid compound and detecting the derivatized product using GLC-FID. Amides and acids can be derivatized for analysis by GLC-FID if first alkylated, esterified or silylated (see generally, Supelco Chromatography Products catalog, 1997, at pages 653–656 (Supelco Inc., Bellefonte Pa.).

The nitrile compounds and/or nitrile and amide compounds and/or amide compounds to be detoxified may be in solid, liquid, and/or gaseous form. When a mixture of nitrile compounds or a mixture of nitrile and amide compounds or a mixture of amide compounds is in the gaseous and/or liquid form, it may be sorbed onto a material, such as a solid. If necessary, the pH of the composition containing the nitrites thereof, can be adjusted to neutrality, i.e., pH about 6 to about 8, prior to contact with the microorganisms or extracts.

In a preferred application of the invention, the detoxification method is used to detoxify a mixture of nitrile compounds or a mixture of nitrile and amide compounds in an aqueous waste stream from a nitrile production plant.

In one mode of this application, the plant is producing acrylonitrile. Acrylonitrile can be produced commercially by the direct ammoxidation of propene (a/k/a propylene) or propane. One illustrative example of the direct ammoxidation of propene is embodied by the SOHIO/BP process (see generally, *Acrylonitrile*, Process Economics Report, Stanford Research International, Menlo Park, Calif., 1979; Weissermel and Arpe, 1978, *Industrial Organic Chemistry*, Verlag Chemie—Weinheim, N.Y., pp. 266–270).

Typically, the wastewater stream(s) of a nitrile production plant contains a high concentration of a mixture of nitrites and amides, including dinitriles, and acrolein cyanohydrin as well as ammonium sulfate. For example, a typical wastewater stream, e.g., Wastewater Column Bottom (WWCB) from an acrylonitrile production plant using the SOHIO process contains approximately 1230 mg/l acrylonitrile, 4500 mg/l acetonitrile, 1490 mg/l acrylamide, 1070 mg/l acrolein (in the form of acrolein cyanohydrin), 547 mg/l succinonitrile, 1446 mg/l fumaronitrile and 335 mg/l total cyanide and 5–8% ammonium sulfate.

Table X illustrates the ranges of concentrations of nitrile and amide compounds in typical wastewater streams from a SOHIO/BP acrylonitrile production plant (AN wastewater).

TABLE X

RANGES OF COMPOUNDS IN REPRESENTATIVE
AN WASTEWATER SAMPLES

|  | NSB† ppm | WWCB† ppm |
| --- | --- | --- |
| Acrolein | 10–100 | 50–1200 |
| Acrylamide | 10–130 | 1100–1500 |
| Propionitrile | ≦20 | 10–150 |
| Acetonitrile | 0–3000 | 20–4500 |
| Acrylonitrile | 5–180 | 10–1250 |
| Succinonitrile | 300–40,000 | 50–5000 |
| Fumaronitrile | ≦100 | 20–1500 |

†NSB = Net Stripper Bottom; WWCB = Wastewater Column Bottom.

Another illustrative example of industrial nitrile production waste which can be detoxified by the methods of the present invention, comprises: acrylonitrile at 50–300 ppm; acrylamide at 0–400 ppm; acetonitrile at 200–5500 ppm; acrolein at 0–300 ppm; propionitrile at 0–100 ppm; succinonitrile at 100–1500 ppm; fumaronitrile at 0–40 ppm and at least one reactive C≡N moiety.

The induced strains are able to detoxify high concentrations of nitrile and/or amide compounds found in the waste streams. The presence or absence of ammonium sulfate does not interfere with the present detoxification methods. Further, the multiply induced microorganisms used in the present detoxification methods are able to detoxify the high concentration(s) of nitriles and/or amides with great speed and efficiency. The rate of detoxification is about 30–50 ppm per minute of each individual nitrile or amide compound present in the mixture of nitrile compounds or in the mixture of nitrile and amide compounds or in the mixture of amide compounds in which the concentration is in the range of up to 350–60,000, or in the range of 1,000–60,000, or in the range of 30,000–60,000 ppm total nitriles and/or amides found in the reaction mixture over the course of the detoxification method.

In another preferred application of the invention, the detoxification method is used to remove a nitrile from an amide preparation, including but not limited to, an acetamide or acrylamide preparation, containing an unwanted or undesired nitrile compound. This application is particularly useful to purify an amide preparation such as an amide preparation being produced in an amide production plant. One illustrative example of an amide preparation is an acrylamide preparation, produced in a commercial acrylamide production plant from acrylonitrile, which may contain undesired nitrile compounds such as acrylonitrile or acetonitrile. The final product acrylamide may contain a significant amount of acrylonitrile and a low level of acetonitrile. For example, in commercial 30–50% acrylamide solution, acrylonitrile is generally >100 ppm and ≦1,000 ppm. The ability of the multiply induced microorganism to detoxify an amide to the corresponding acid must be inactivated or destroyed before the microorganism can be used in this application. Since the amide detoxification activity is sensitive to heat at about 55° C. to 60° C., the multiply induced microorganism is preferably heated to at least about 55° C. to 60° C., more preferably about 60–100° C. prior to or concurrently with contacting with the amide preparation. Amidase inactivation can be monitored following heating at 60–100° C. for various times and nitrile hydratase and amidase activity measured to determine the optimal time period for inactivation. The time period for inactivation at a given temperature will depend upon the concentration of cells or extract and the degree of mixing. Determination of the appropriate period is well within the skill in the art. In a preferred mode, the multiply induced microorganism is heated to about 70–100° C. for several times, for example, for 10 seconds about three times at 100° C., prior to contacting with the amide preparation.

Further, the detoxification method is preferably carried out at temperatures from 4–80° C., preferably 25–70° C. which results in a much faster conversion of the nitrile compound to the corresponding amide compound. The multiply induced microorganism induced, for example, using a growing medium containing a carbohydrate, urea and cobalt and acrylonitrile, acetonitrile and succinonitrile at 150, 150 and 50 ppm, respectively, and optionally KCN or NaCN at 10 ppm, can be used as fresh, stabilized or immobilized cells or extract. Immobilization is preferably in polyacrylamide or hardened alginate. The process of removing undesired nitrile can be accomplished either at the time the amide, such as acrylamide, is produced or later after the production is complete including after packaging or during shipment and/or storage.

In yet another preferred application of the invention, the detoxification method is combined with a portion of a chemical synthetic process for producing an amide such as acrylamide. Thus, this application provides a hybrid chemical/biological method of producing an amide such as acrylamide. According to one exemplary embodiment of this application, a chemically synthetic process, such as the SOHIO/BP process, (see generally, Acrylonitrile,, 1979; Weissermel and Arpe, 1978, supra), which entails the direct ammoxidation of propene (a/k/a propylene) by ammonia vapors in air in the presence of a catalyst to produce acrylamide is used to produce an intermediate solution comprising about 30% or more acrylamide and 10% or less of acrylonitrile. The intermediate solution of approximately 30% or more acrylamide and about 10% or less acrylonitrile is contacted with a multiply induced microorganism or extract thereof, for a time sufficient to convert the acrylonitrile to acrylamide so that the amount of acrylonitrile is reduced to about 100 ppm or less. The resulting solution contains about 50% acrylamide and less than 100 ppm acrylonitrile. The ability of the multiply induced microorganism to detoxify acrylamide to acrylic acid is preferably inactivated or destroyed before the microorganism can be used in this application. Since the amide detoxification activity is sensitive to heat at about 55° C. to 60° C., the multiply induced microorganism is preferably heated to at least about 55° C. to 60° C., more preferably 60–100° C. prior to or concurrently with contacting with the solution. In a preferred mode, the multiply induced microorganism is heated to about 70–100° C. for several times, for example, for 10 seconds at about three times at 100° C., prior to contacting with the solution. Further, this method is preferably carried out at temperatures >50° C. which results in a much faster conversion of acrylonitrile to acrylamide. The amide detoxification activity is also sensitive to $SO_2$. Thus, alternatively, the multiply induced microorganism is contacted with $SO_2$, for example, by bubbling $SO_2$ through a buffer containing the microorganism prior to or concurrently with contacting with the solution containing the contaminating nitrile compound.

This hybrid chemical/biological synthetic application is considerably improved over the completely chemical process for producing acrylamide in terms of improved processing time, lower cost, elimination of the need for multiple chemical processes to convert the acrylonitrile formed during the chemical process, and elimination of the need to purify the acrylamide solution such that it contains less than 100 ppm acrylonitrile. This application is preferably applicable to a batch process or a multi-step batch or semi-continuous mode of synthesis.

In yet another preferred application of the invention, the detoxification method is used to remove acetonitrile from a preparation of an acetonitrile butadiene styrene co-polymer (ABS co-polymer). This application is particularly useful to purify an ABS co-polymer.

In still another preferred application of the invention, the detoxification method is used to convert an amide monomer in a polyamide or polymerized amide preparation, containing an unwanted or undesired amide monomer, to the corresponding monomeric acid compound which can be readily removed from the preparation, for example, by any means of chemical separation known to those skilled in the art. For example, acrylamide can be converted to acrylic acid which is readily removed as the ammonium salt. This application is particularly useful to purify a polyamide or polymerized amide preparation, such as a polyacrylamide preparation or a co-polymer containing acrylamide. Any polyamide or polymerized amide preparation containing unwanted monomer can be treated according to this application of the invention, including anionic, cationic, and non-ionic polyamide preparations at a pH of about 2 to less than 6, preferably at a pH of about 3 to about 5, more preferably at a pH of about 3 to about 4. Advantageously, a cationic polyamide or polymerized amide containing an amide monomer can be treated at a pH of less than about 6.0, preferably at a pH of about 2 to 4 and most preferably at a pH of about 3 to about 4, such that the cationic side chain groups do not lose their functionality as they might if the pH were adjusted to a pH of about 6 or above before removing the unwanted monomer. Preferably, the induced microorganism, or extract thereof, is immobilized.

In a particular illustrative embodiment of the application of the invention described in the paragraph immediately above, the detoxification method is used to convert unwanted acrylamide monomer to acrylic acid in a polyacrylamide preparation. A pure culture, or an extract, of a useful microorganism strain, multiply induced and immobilized as taught herein, is contacted with a polyacrylamide preparation containing unwanted acrylamide monomer, said preparation having a pH of about 2 to less than 6, for a period of time sufficient to reduce the amount of acrylamide monomer in the polyacrylamide preparation, preferably to less than 100 ppm acrylamide monomer. Alternatively, a pure culture, or an extract, of a useful microorganism strain, multiply induced and immobilized as taught herein, is contacted at a pH of about 2 to less than 6 with an acrylamide monomer preparation simultaneously with a polymerizing agent (an agent which causes the amide monomer to polymerize to polyacrylamide) such that residual acrylamide monomer (after the polymerization reaction) is converted to the corresponding acrylic acid. Such polymerizing agents include, but are not limited to, agents such as a persulfate, a sulfate, a bromate, a chlorate, a peroxide, or a mixture thereof, etc. The concentration of acrylamide monomer in a polyacrylamide preparation may be as high as 100,000 ppm and is generally from about less than 10,000 ppm to about 40,000 ppm and using the methods of the present invention, the levels of acrylamide monomer are reduced to less than 1000 ppm, preferably to less than 100 ppm.

Preferably, the extract is a crude extract of an individual microorganism strain. Methods for preparing extracts of the microorganism strain are described above in this section of the application. Preferably, a pure culture or an extract of a microorganism, described in detail above in Section 5.2, induced as taught herein, is employed. Alternatively, a pure culture or an extract of a microorganism capable of detoxifying a mixture of nitrile compounds or a mixture of nitrile and amide compounds or a mixture of amide compounds, which has been identified using the screening method(s) described above in Section 5.1.3 is employed. The crude extract, optionally, can be further purified by enzyme purification methods known in the art such as ion exchange column chromatography before contacting.

In a preferred embodiment, the microorganism strain, or an extract thereof, is immobilized. Methods for immobilization of the microorganism strain, or extract thereof, are described above in this section of the application. More preferably, the induced microorganism, or extract thereof, is immobilized in alginate beads that have been cross-linked with polyethylene imide or immobilized in a polyacrylamide-type polymer or on Dowex™ (Dow Chemical Co., Inc.), an ion exchange resin. Alternatively, in another preferred embodiment, the microorganism or extract is immobilized on a planar surface of a material. A polyamide, e.g., polyacrylamide, preparation is passed over the planar surface having the immobilized microorganism or extract thereof. In one embodiment, the polyamide preparation is an aqueous preparation. In an illustrative embodiment, the planar surface is in the form of a sheet or a series of sheets of a material on which an induced microorganism or extract is immobilized. In the preferred embodiment, the immobilized multiply induced microorganism or extract can easily be reused by simply flowing a new preparation over the planar surface and there is no need to recover the multiply induced microorganism or extract from the polyamide product. Immobilization allows for maximum retention amd re-use of the microorganism, or extract thereof, to remove more monomer, thus decreasing the amount of microorganism, or extract thereof, utilized, and thus, reducing costs. Furthermore, the need for mixing, i.e., imparting additional energy, and the amount of microorganism, or extract thereof, in the polyamide preparation is minimized. Also alternatively, the microorganism, or extract thereof, is immobilized by contact with an amide monomer preparation together with a polymerizing agent and a cross-linking agent, such that the microorganism, or extract thereof, becomes immobilized in the resulting polyamide preparation, in which it removes residual amide monomer.

Moreover, in the manufacturing of polyacrylamide preparations, unwanted residual monomer nitrile compounds can also be present and the detoxification method detailed above also allows for the conversion of these nitrile monomer compounds, in addition to the residual amide monomer compounds present, to the corresponding acid compounds, which are readily removed in their salt form.

Any method for contacting the induced microorganism strain with a composition comprising a mixture of nitrile compounds or a mixture of nitrile and amide compounds or a mixture of amide compounds, including a mixture of amide monomer(s) and polyamide(s), can be used according to the present invention. Such methods for contacting include, but are not limited to, contacting in a closed vessel or container or with an apparatus containing the induced strains, etc.

Energy can be imparted, for example, by imparting mechanical energy, e.g., by mixing; by imparting acoustic energy; e.g., by setting up a standing acoustic wave in the fluid; or by imparting an electrical or electrostatic field.

The mixture of nitrile compounds or mixture of nitrile and amide compounds or mixture of amide compounds and the multiply induced pure cultures of microorganisms may be maintained under conditions which favor the growth of the bacteria and the detoxification of the desired compounds as described above.

Alternatively, the mixture of nitrile compounds or mixture of nitrile and amide compounds or mixture of amide compounds and the multiply induced pure cultures of microorganisms may also be maintained under conditions which do not necessarily favor the growth of the bacteria but rather support the (enzymatic) nitrile hydratase, amidase, and/or nitrilase activity of the multiply induced microorganisms. For example, temperature can be maintained between about 0° C. and 65° C. preferably between about 4° C. and 55° C., more preferably between about 25° C. and 55° C. The pH is optimally maintained in the range of about pH 6 to 8. These conditions are possible because detoxification is not growth dependent, i.e., once the nitrile and/or amide detoxifying activity is induced, the microorganism no longer needs to grow to detoxify. Additionally, the mixture of nitrile compounds or mixture of nitrile and amide compounds or mixture of amide compounds and the multiply induced pure cultures of microorganisms may also be maintained under anaerobic conditions.

At different time points one may remove samples and measure the concentration of selected nitrile and/or amide compounds by methods known to those skilled in the art, for example, GLC-FID, etc.

5.3.1. Modes of Operation

The methods for detoxification of a mixture of nitrile compounds or a mixture of nitrile and amide compounds or a mixture of amide compounds of the present invention can be operated in a variety of modes, including batch mode, sequencing batch mode, continuous or semi-continuous mode, and flow-through using a biofilter.

In all modes of operation, samples of the contents may be removed periodically to monitor detoxification of the compounds of interest. Additionally, the agitating and/or mixing of the reactor contents may induce foaming. In these cases, an anti-foaming agent may be added to prevent foaming. Suitable anti-foaming agents include such as silicon containing anti-foam emulsion (e.g., Dow ANTIFOAM-A®; a silicon based anti-foaming agent).

5.3.1.1. Batch Mode Operation

Batch mode operation entails placing a fluid containing a mixture of nitrile compounds or a mixture of nitrile and amide compounds or a mixture of amide compounds, for example, two or more nitriles selected from the group consisting of acetonitrile, acrylonitrile, adiponitrile, fumaronitrile, succinonitrile, cyanide, benzonitrile, butyronitrile, acrolein (which in the mixture is in the form of acrolein cyanohydrin) and crotononitrile into a vessel, such as a bioreactor, inoculating with microorganisms induced as described in Section 5.1 and incubating the mixture to culture the microorganisms such that the mixture of nitrile compounds or mixture of nitrile and amide compounds or mixture of amide compounds is detoxified. After a predetermined time period, the incubation is stopped and the contents are removed and the solids, if any, are separated from the liquid by filtration. Samples may then be taken from both the solid and liquid phase and tested, for example, by GLC-FID, to assess the level of the nitrile and/or amide compounds and to confirm that the nitrile and/or amide compounds have been detoxified. The reactor solids are subsequently dewatered and may be further processed into, for example, a landfill or may be used as bacterial inoculum for the next batch mode. In batch mode the dewatered solid residue is re-added at about 2%–40% by weight or volume, preferably at about 5%–20%. Air or oxygen may be pumped into the reactor and the contents agitated, mechanically in the bioreactor.

5.3.1.2. Sequencing Batch Mode Operation

Sequencing batch mode is operated much the same as batch mode except that after the incubation period is over, the reactor is allowed to settle for a time, usually about 15 minutes, and the top 60%–95% of the reactor contents are removed, leaving settled solids, if any, at the bottom as inoculum for the next batch of neutralized fluid. Preferably between 70% and 90% of the contents are drawn off. Sequencing batch mode is a preferred embodiment for detoxification of fluids because the lag or acclimation phase is reduced, high levels of biomass are retained in the reactor, variability in the composition of the waste feed is better accommodated, and the residual solids remaining after biotreatment are potentially reduced.

5.3.1.3. Semi-continuous/continuous Mode

Semi-continuous/continuous mode is similar to both batch and sequencing batch modes. However, rather than stopping the incubation after a predetermined time, fresh fluid containing a mixture of nitrile compounds or a mixture of nitrile and amide compounds or a mixture of amide compounds is pumped into the bioreactor in a fixed amount over a given period of time as treated fluid is drawn out of the bioreactor. This provides for a continuous treatment of fluid without having to stop the detoxification process.

5.3.2. Biofilters

Another embodiment of the present invention provides for a biofilter. Biofilters are used in the detoxification of mixtures of nitrile compounds, mixtures of nitrile and amide compounds and mixtures of amide compounds in effluents such as air, vapors, aerosols, and water or aqueous solutions. For example, if volatile nitrile compounds are present, the volatiles may be stripped from solid or aqueous solution in which they are found and steps should be carried out in such a way that the volatiles are trapped in a biofilter. Once trapped, the volatiles can be detoxified with a pure culture or an extract of a microorganism strain, as described below. In one mode of this embodiment, a classic-type biofilter can be used, in which air containing a mixture of nitrile compound or a mixture of nitrile and amide compounds or a mixture of amide compounds is passed through the biofilter apparatus. In another mode of this embodiment, a trickle-bed biofilter can be used, in which air and aqueous solutions containing a mixture of nitrile compounds or a mixture of nitrile and amide compounds or a mixture of amide compounds is passed through the biofilter apparatus.

The biofilters of the present invention comprise an apparatus having a pure culture of an microorganism induced according to the methods of the present invention, or an extract thereof, immobilized on a solid support. The microorganism can be actively dividing or not actively dividing. The microorganism can also have been lyophilized before combination with the biofilter apparatus. Suitable solid supports include, but are not limited to granular activated carbon, compost, wood residue products, (e.g., wood chips, nuggets, shredded pallets or trees), alumina, ruthenium, iron oxide, ion exchange resins, (e.g., Amberlite™ IRA-93 or IRA-96 (Rohm & Haas), DOWEX™ (Dow Chemical Co, Inc.), DEAE cellulose, DEAE-SEPHADEX™ (Pharmacia, Inc.), ceramic beads, polyacrylamide beads, alginate beads, κ-carrageenan cubes as well as solid particles that can be recovered from the aqueous solutions due to inherent magnetic ability. Preferably, the solid support is alginate beads that have been cross-linked with polyethylene imide. Alternatively, the microorganism or extract thereof can be immobilized on a planar surface of a material. The biofilter apparatus can have influx and efflux orifices, such that the material to be treated can flow through the apparatus. In a preferred embodiment, the microorganism attached to the solid support is selected from the group consisting of microorganisms having ATCC Accession No. 55899, 55898, 55722, 55723, 55726, 55727, 55724, and 55725, which has been induced according to the present invention.

The biofilters can be used in a method which comprises flowing an effluent, containing a mixture of nitrile compounds or a mixture of nitrile and amide compounds or a mixture of amide compounds through a biofilter which comprises an apparatus having a pure culture of a microorganism induced according to the present invention, or an extract thereof, immobilized on a solid support. The method may further comprise monitoring the effluent to determine that the nitrile and/or amide compounds have indeed been detoxified. In a preferred embodiment, the microorganism attached to the solid support is selected from the group consisting of microorganisms having ATCC Accession No. 55899, 55898, 55722, 55723, 55726, 55727, 55724, and 55725, which has been induced according to the present invention.

5.4. Kits

The present invention provides for kits comprising a pure culture of a microorganism strain which has been multiply induced and is able to detoxify a mixture of nitrile compounds or a mixture of nitrile and amide compounds or a mixture of amide compounds. The microorganism strain can be actively dividing or lyophilized or frozen and can be added directly to an aqueous solution containing the nitrile and/or amide compounds. In a preferred embodiment, the kit comprises an induced lyophilized strain. The strain can also be immobilized onto a solid support, including, granular activated carbon, wood chips, alumina, ruthenium, iron oxide, ceramic or alginate beads as well as solid particles that can be recovered from the aqueous solutions due to inherent magnetic ability. Other kit components can include, for example, a mixture of nitrile compounds or a mixture of nitrile and amide compounds for induction of microorganisms, as well as kit components such as vials, packaging components and the like, which are well known to those skilled in the art.

The following examples are presented for purposes of illustration only and are not intended to limit the scope of the invention in any way.

6. EXAMPLE

Effect of Different Induction Mixtures on Detoxification Ability

This example demonstrates the effect of different induction mixtures on the ability of an exemplary microorganism, i.e., Rhodococcus sp. strain DAP 96253, to detoxify a mixture of nitrile and amide compounds.

A pure culture of the microorganism Rhodococcus sp. strain DAP 96253 was multiply induced as described in Section 5.1, above, by growing the strain on nutritionally complete YEMEA medium (yeast extract, 4.0 g; malt extract, 10 g; dextrose, 4.0 g; agar, 20 g and distilled $H_2O$, 1.0 liter) agar plates supplemented with one of the different induction mixtures summarized in Table XI. The cells were harvested from the plates, centrifuged and washed with phosphate buffered saline (PBS).

The microorganism strain was evaluated by testing the differently induced cells in small batch reactions, at 25° C., for their ability to detoxify a test mixture containing 164 ppm acrylonitrile, 160 ppm acetonitrile, 51 ppm acrylamide, 54 ppm acrolein, 51 ppm fumaronitrile, and 102 ppm succinonitrile in the presence of a reactive $C\equiv N$ moiety. The multiply induced cells were contacted with the test mixture at 25° C. and the disappearance of the 6 initial different nitrile and amide compounds present in the test mixture was monitored by GLC-FID.

Results are shown in Table XII.

TABLE XI

INDUCTION MIXTURES

| INDUCER COMPOUND ADDED (PPM) | B, K, | A | C | D | E | F | G | H | I | J |
|---|---|---|---|---|---|---|---|---|---|---|
| Acetonitrile | 150 | 150 | | | 100 | 50 | 200 | 500 | 150 | 150 |
| Acrylonitrile | 150 | | 150 | | 100 | 50 | 200 | 500 | 150 | 150 |
| Acetamide | | | | 150 | | | | | | |
| Acrylamide | | | | 150 | | | | | | |
| Succinonitrile | 50 | 50 | 50 | 50 | 50 | 50 | 50 | 50 | 100 | 25 |
| Fumaronitrile | | | | | | | | | | |

TABLE XII

EFFECT OF INDUCTION MIXTURES ON DETOXIFICATION ACTIVITY

| COMPOUND | B, K, | A | C | D | E | F | G | H | I | J |
|---|---|---|---|---|---|---|---|---|---|---|
| Acrolein | ++++ | +++ | +++ | +++ | ++++ | +++/++++ | +++ | +++/++++ | ++++ | ++++ |
| Acetonitrile | ++++ | ++/+++ | ++++ | +++ | +++ | +++ | ++++ | ++++ | ++++ | ++++ |
| Acrylonitrile | ++++ | ++/+++ | ++++ | +++ | +++ | ++/+++ | ++++ | ++++ | ++++ | ++++ |
| Acetamide* | ++++ | +++ | +++ | +++ | +++ | +++ | +++/++++ | +++ | +++ | ++++ |
| Acrylamide | ++++ | +++ | ++++ | ++++ | ++++ | +++ | +++ | ++++ | +++ | ++++ |
| Succinonitrile | ++++ | +++/++++ | ++++ | +++ | +++ | ++++ | +++ | ++++ | ++++ | ++++ |
| Fumaronitrile | ++++ | ++++ | ++++ | ++++ | ++++ | ++++ | ++++ | ++++ | ++++ | ++++ |

Activity Key: + = slight activity, ++ = moderate activity, +++ good activity, ++++ = excellent activity.
*Acetamide was not initially present in the test mixture of nitrile and amide compounds but was formed by conversion of acetonitrile.

The induction mixture of acetonitrile (150 ppm), acrylonitrile (150 ppm) and succinonitrile (50 ppm) gave the best detoxification activity under the conditions tested. Eliminating either acrylonitrile or acetonitrile did not eliminate the detoxification activity for that particular nitrile compound. However, when one of the mono-nitrile compounds was omitted from the induction mixture, overall activity was not as great as when both mono-nitriles were present. Reducing the level of acrylonitrile or acetonitrile in the induction mixture did not influence the spectrum of nitrile or amide compounds converted, but did result in a lower level of detoxification activity. On the other hand, increasing the level of acrylonitrile or acetonitrile in the induction mixture, did not proportionally increase the level of detoxification activity. Altering the concentration of succinonitrile had no impact on the detoxification activity for succinonitrile. However, at higher concentrations of succinonitrile, (100 ppm), the level of activity against acetamide and acrylamide was somewhat diminished.

The replacement of acetonitrile and acrylonitrile with acetamide and acrylamide as inducer compounds did not decrease the spectrum of nitrile and/or amide compounds detoxified. It did, however, result in a slightly lower level of detoxification activity.

7. EXAMPLE

Ability of Rhodococcus sp. Strain Dap 96253 to Detoxify Nitriles

This example demonstrates the broad detoxification ability of multiply induced Rhodococcus sp. strain DAP 96253. The strain was multiply induced as described in Section 5.1, above, on nutritionally complete YEMEA medium supplemented with 150 ppm acrylonitrile, 150 ppm acetonitrile and 50 ppm succinonitrile. The cells were harvested, washed and resuspended in phosphate buffered saline. The cells were then contacted with benzonitrile, crotononitrile, butyronitrile and adiponitrile, individually, each at a concentration of about 100–150 ppm at 30° C. and at an initial pH of about 7. The detoxification reaction was monitored by the release of ammonia according to the method of Fawcett and Scott, supra.

Within 10 minutes, detoxification of the nitrile moiety of benzonitrile was essentially complete. For crotononitrile and butyronitrile, detoxification of the nitrile group occurred, but was less rapid, i.e., in 10 minutes only 10–20% of the two compounds was detoxified. No detoxification activity was seen with adiponitrile in 10 minutes.

These results demonstrate that multiple induction using acetonitrile, acrylonitrile and succinonitrile induces the microorganism strain to detoxify a wide variety of nitrile compounds. Further, the results demonstrate that aromatic nitrile detoxifying activity can be induced by multiple induction using aliphatic nitriles.

8. EXAMPLE

Effects of Reaction Conditions on Detoxification

This example demonstrates the different conditions, e.g., different temperatures, pH, ammonium sulfate concentrations, and presence or absence of oxygen, under which the detoxification reactions can be carried out. In the experiments in this section, a pure culture of Rhodococcus sp. strain DAP 96253 or *Rhodococcus rhodochrous* strain DAP 96622 was first multiply induced as described in Section 5.1, above, using nutritionally complete YEMEA medium supplemented with 150 ppm acetonitrile, 150 ppm acrylonitrile and 50 ppm succinonitrile and then tested for nitrile detoxification activity according to the methods below.

8.1. Temperature

The detoxification of acetonitrile and acrylonitrile by Rhodococcus sp. strain DAP 96253 at different temperatures was studied. A pure culture of the induced microorganism Rhodococcus sp. strain DAP 96253 was added to an aqueous mixture containing acrylonitrile or acetonitrile at 37° C., 40° C. and 55° C. and the disappearance of the nitrile compound was monitored by GLC-FID.

The results (not shown) demonstrated that the ability of Rhodococcus sp. strain DAP 96253 to detoxify acetonitrile is essentially the same at the three temperatures tested. Similarly, the ability to detoxify acrylonitrile is also the same at the three temperatures tested.

In another set of experiments, the effect of temperature on the rate of nitrile detoxification was tested. A pure culture of multiply induced microorganism *Rhodococcus rhodochrous* strain DAP 96622 was added to different samples, each sample containing either acetonitrile or acetonitrile at a concentration of 150 ppm each. The different samples with the induced microorganism were incubated at temperatures of 25° C., 35° C., 45° C., 55° C., 60° C., 70° C. and 80° C. and the disappearance of the nitrile compounds was monitored by GLC-FID. The rate of detoxification in $\mu$M/minute was calculated. The results are presented in FIG. 1.

FIG. 1 shows that the rate of nitrile detoxification remains constant or improved slightly with increasing temperature between 25° C. and 55° C. However, at temperatures greater than 55° C., the rate of detoxification decreases.

8.2. pH

Induced cells of *Rhodococcus rhodochrous* strain DAP 96622 were tested for their ability to detoxify a mixture of nitrile and amide compounds, specifically, 164.3 ppm acrylonitrile, 159.9 ppm acetonitrile, 51.4 ppm acrylamide, 53.5 ppm acrolein, 51 ppm fumaronitrile, and 101.9 ppm succinonitrile at three different pH values, pH 6, pH 7 and pH 8. The disappearance of acetonitrile and acrylonitrile was monitored by GLC-FID. At different time points, the reaction contents were centrifuged, the supernatant decanted and a fresh mixture nitrile and amide compounds added, and, if necessary, the pH of the reaction mixture was adjusted to the appropriate test pH. The results are presented in FIGS. 2A–2C.

Figure 2A:
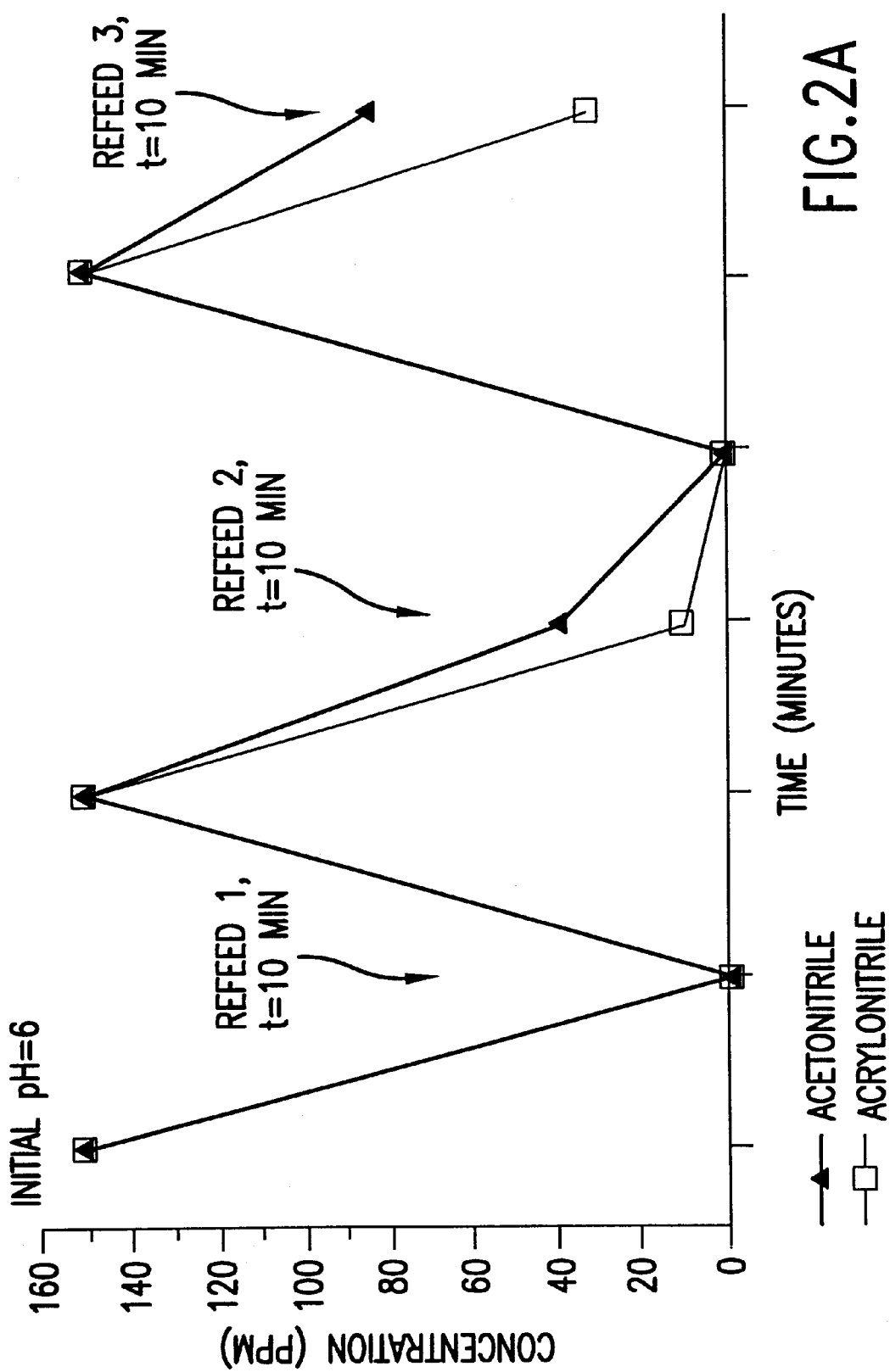
Figure 2C:
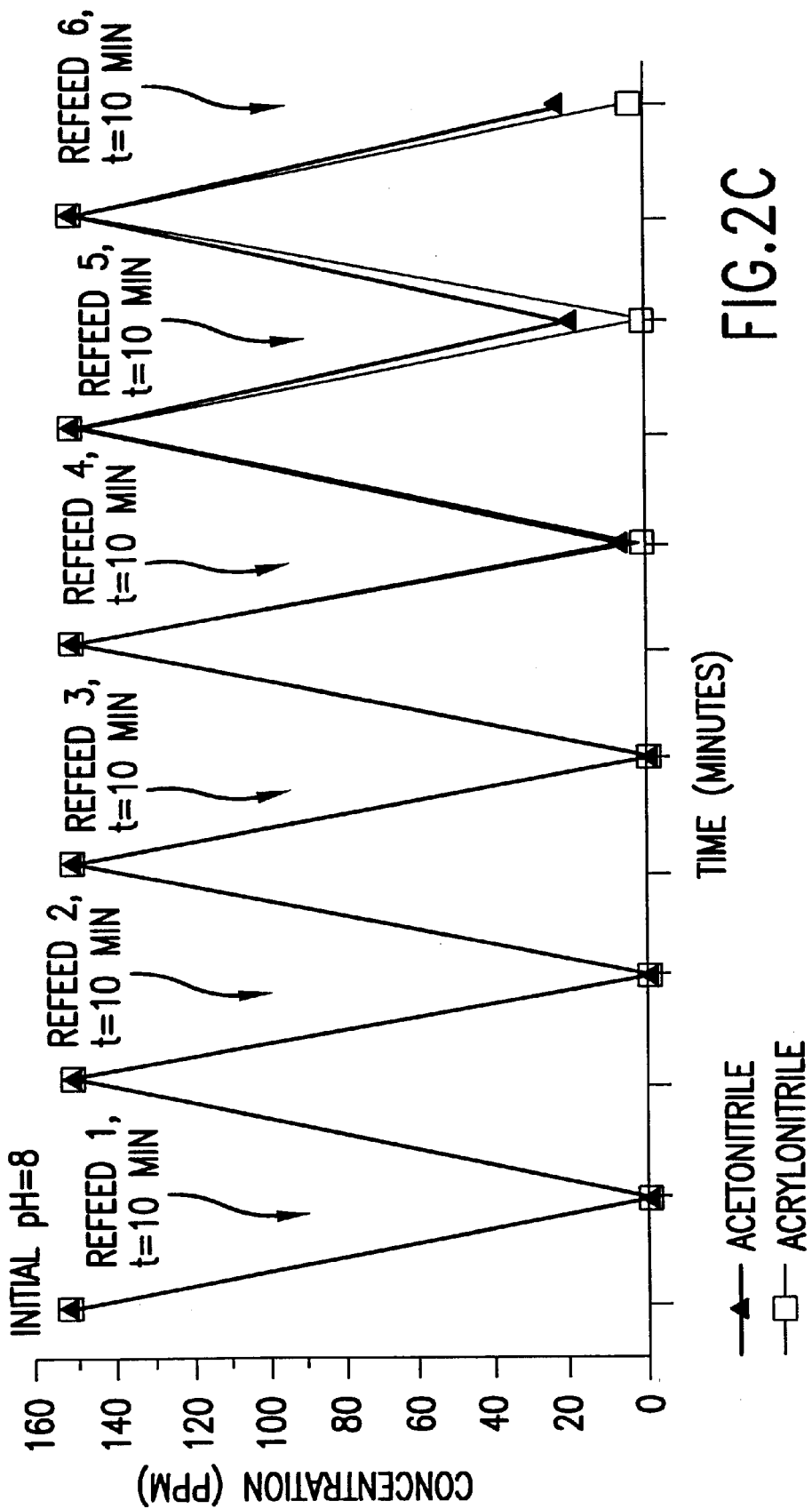

The results presented in FIGS. 2A–2C demonstrate that detoxification activity of acetonitrile and acrylonitrile at pH values of 6, 7 and 8, respectively, initially remained constant over the full range. However, with repeated re-feeding, detoxification activity at pH 6 begins to decline after the third re-feeding, and detoxification activity at pH 8 begins to decline after 5 or more re-feedings.

8.3. Ammonium Sulfate

Ammonium sulfate is found in the wastestreams of acrylonitrile producing plants using the SOHIO/BP production process in concentrations as high as 8% (wt/wt). To determine the effect, if any, of ammonium sulfate on nitrile detoxification, detoxification reactions were carried out with a range of ammonium sulfate concentrations from 0 to 8% (wt/wt).

Induced cells of *Rhodococcus rhodochrous* strain DAP 96622 were tested for their ability to detoxify a mixture of nitrile and amide compounds, specifically, 164.3 ppm acrylonitrile, 159.9 ppm acetonitrile, 51.4 ppm acrylamide, 53.5 ppm acrolein, 51 ppm fumaronitrile, and 101.9 ppm succinonitrile at different concentrations of ammonium sulfate ranging from 0 to 8% (wt/wt). The disappearance of the nitrile and amide compounds was monitored by GLC-FID.

At all the different concentrations of ammonium sulfate tested, no effect on the detoxification ability of the induced microorganism strain was seen (results not shown).

8.4. Oxygen

Induced cells of *Rhodococcus rhodochrous* strain DAP 96622 or induced cells of Rhodococcus sp. strain DAP 96253 were tested for their ability to detoxify a test mixture of nitrile and amide compounds, specifically, 164.3 ppm acrylonitrile, 159.9 ppm acetonitrile, 51.4 ppm acrylamide, 53.5 ppm acrolein, 51 ppm fumaronitrile, and 101.9 ppm succinonitrile in the presence or absence of oxygen. The cells of the two strains were induced as described in Section 5.1, above, harvested and concentrated. The concentrated cells were split into two equal pellets. For anaerobic testing the pellet was resuspended with nitrogen-purged Stanier's medium and re-centrifuged. The pellet was subsequently purged with nitrogen and placed in a tube which was then capped. The reagent flasks used in the anaerobic testing were autoclaved with minimized head-gas space. After autoclaving, the flasks were emptied while still hot and capped.

The de-aerated pellet was mixed with de-aerated, nitrogen-purged medium containing the test mixture and the aerated pellet was mixed with the test mixture. The aerated pellet was mixed with the test mixture that had not been deaerated. The reactions were incubated without agitation. The disappearance of the nitrile and amide compounds was monitored by GLC-FID.

There was no significant difference seen in the detoxification reactions in the absence or presence of oxygen. While oxygen is needed for growth of the microorganisms, oxygen was not required for detoxification.

The results of the experiments described in this section clearly demonstrate that the detoxification reactions can proceed under a variety of different conditions.

9. EXAMPLE

Detoxification of a Mixture of Nitrile and Amide Compounds

This example demonstrates the ability of an induced Rhodococcus sp. strain DAP 96253 to detoxify a mixture nitrile and amide compounds. Rhodococcus sp. strain DAP 96253 was multiply induced by growing the strain on nutritionally complete YEMEA medium supplemented with 150 ppm acetonitrile, 150 ppm acrylonitrile and 50 ppm succinonitrile. The induced cells were collected and 100 mg dry weight cells was contacted with 300 ml of an aqueous solution containing a mixture of nitrile compounds, specifically, 164.3 ppm acrylonitrile, 159.9 ppm acetonitrile, 51.4 ppm acrylamide, 53.5 ppm acrolein, 51 ppm fumaronitrile, and 101.9 ppm succinonitrile. The reaction was carried out at 25° C. and at an initial pH of 7. The disappearance of acrolein, acetamide, acrylonitrile, acetonitrile, succinonitrile, and fumaronitrile was monitored by GLC-FID. The results are presented in FIG. 3.

FIG. 3 demonstrates that the multiply induced microorganism strain, induced as described above, was able to detoxify a mixture of nitrile and amide compounds nearly to non-detectable levels in 360 minutes. The fumaronitrile analysis shown is not accurate, as resolution of fumaronitrile in the mixture of nitrites and amides is difficult at levels below 50 ppm with the specific utilized detection method.

10. EXAMPLE

Detoxification of Wastewater Column Bottom

This example demonstrates the ability of a multiply induced Rhodococcus rhodochrous strain DAP 96622 to detoxify a mixture of nitrile compounds from a wastewater column bottom at two different concentrations. A wastewater column bottom (WWCB) obtained from a acrylonitrile production plant using the SOHIO/BP method of acrylonitrile production, supplemented with acrylonitrile and acetonitrile, either full strength or diluted 1:5 with water, was detoxified using induced cells of the microorganism Rhodococcus rhodochrous strain DAP 96622. A pure culture of the microorganism Rhodococcus rhodochrous strain DAP 96622 was multiply induced as described in Section 5.1, above, by culturing the microorganism on nutritionally complete YEMEA medium supplemented with 150 ppm acetonitrile, 150 ppm acrylonitrile and 50 ppm succinonitrile. The induced cells were harvested and added to test mixtures of nitriles (designated mixtures A and B) to be detoxified containing either of the two different concentrations of WWCB each supplemented with acetonitrile and acrylonitrile. Mixture A was full strength WWCB material supplemented with 200 ppm each of acrylonitrile and acetonitrile. Mixture B was a dilution of WWCB (diluted 1:5 with water) supplemented with acetonitrile and acrylonitrile at 150 ppm each. Disappearance of acetonitrile, acrylonitrile, succinonitrile and fumaronitrile from each mixture was monitored by GLC-FID. The results are presented in FIGS. 4A for Mixture A and 4B for Mixture B.

Figure 4A:
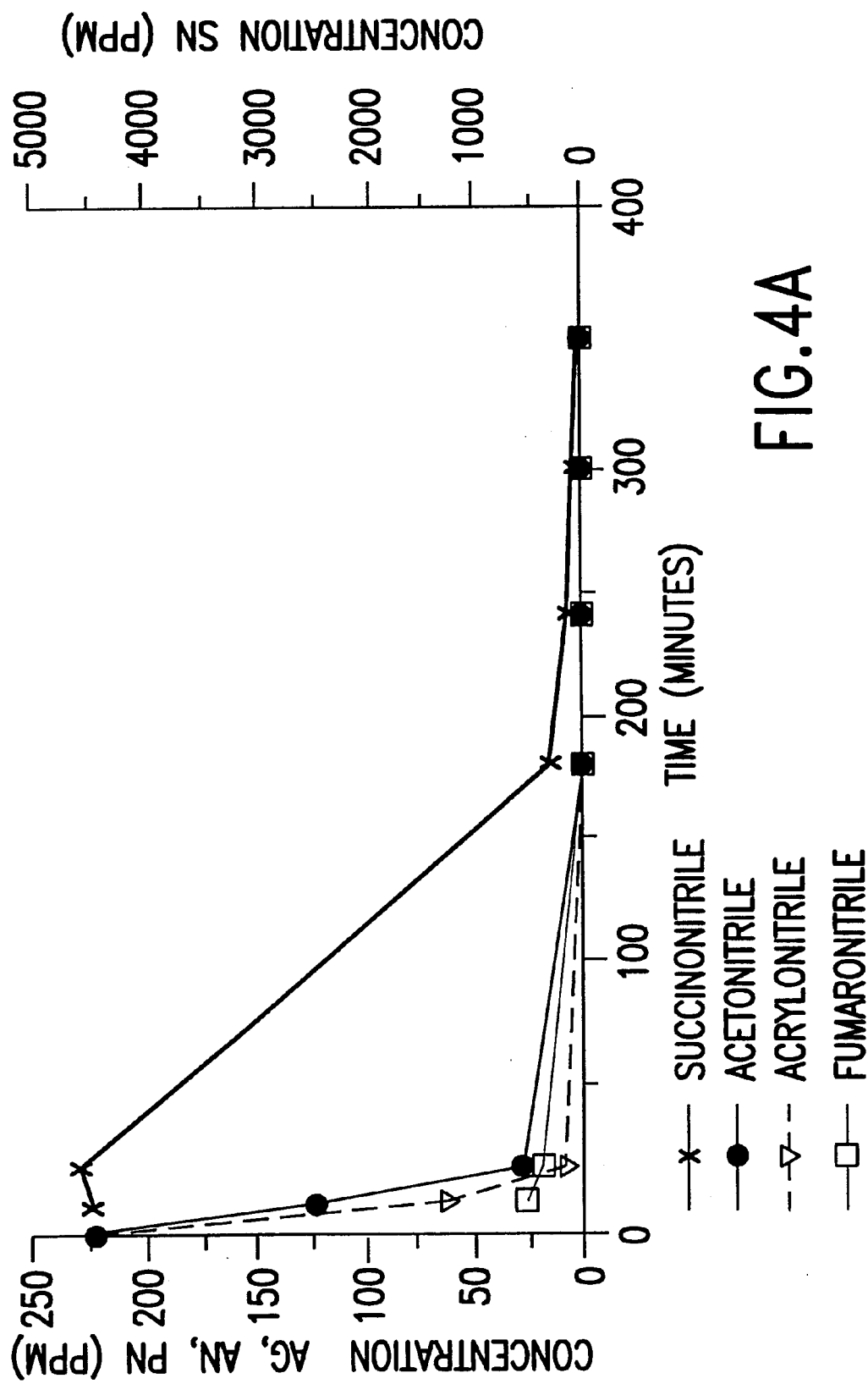
FIGS. 4A and 4B are graphs showing the ability of *R. rhodochrous* strain DAP 96622 induced as taught herein to detoxify a wastewater column bottom, either diluted 1:5 (FIG. 4A) or at full strength (FIG. 4B). See text, Section 10, for details.
Figure 4B:
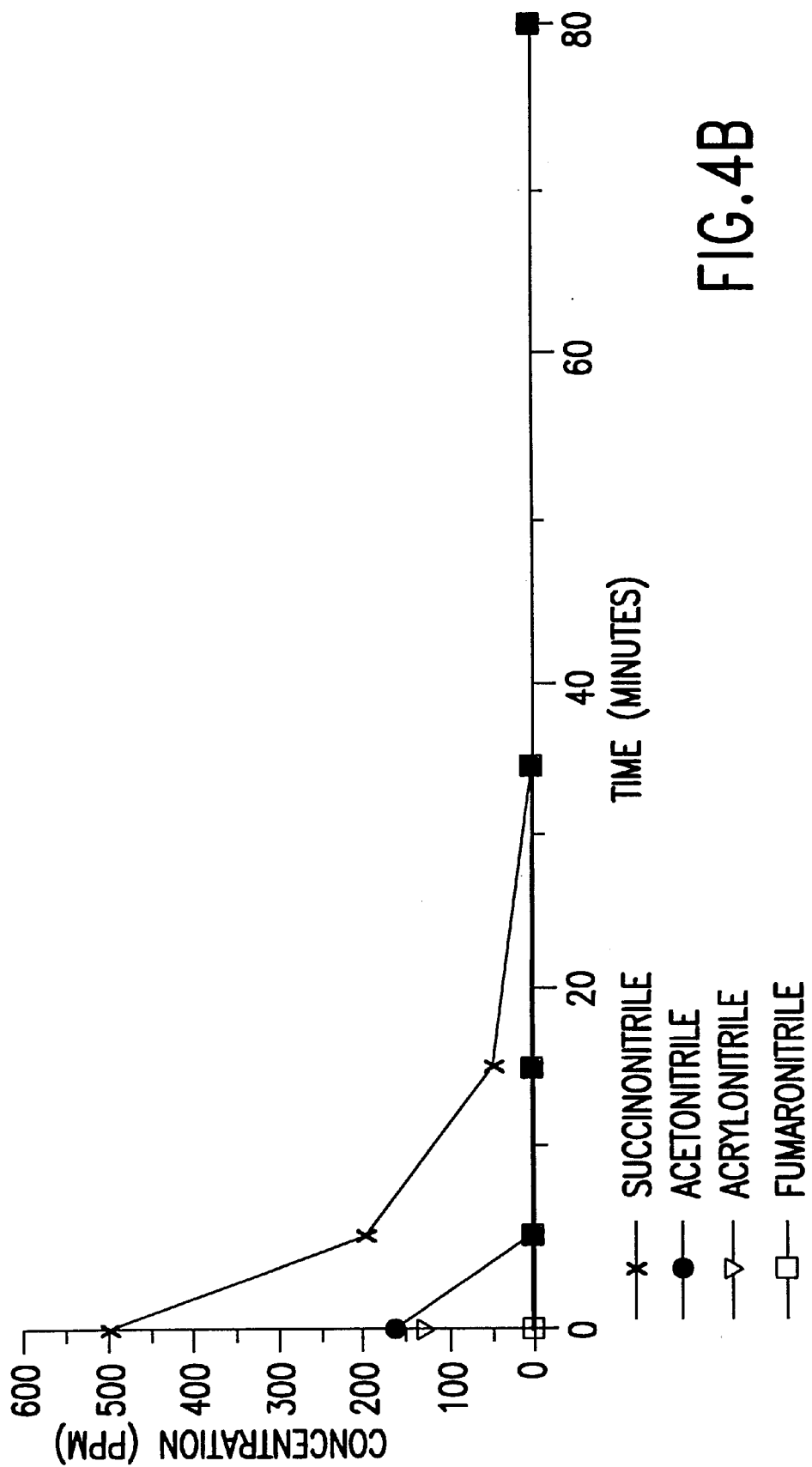

The results presented in FIGS. 4A and 4B clearly demonstrate that the induced Rhodococcus rhodochrous strain DAP 96622 is able to detoxify a mixture of nitrile compounds found in both the diluted and the full strength WWCB, respectfully, on the order of minutes to hours.

11. EXAMPLE

Detoxification of Net Stripper Bottom

This example demonstrates the ability of a multiply induced Rhodococcus sp. strain DAP 96253 to detoxify a mixture of nitrile compounds from a net stripper bottom. A net stripper bottom (NSB) obtained from an acrylonitrile producing plant using the SOHIO/BP method of acrylonitrile production (supplemented with acrylonitrile and acetonitrile) was detoxified using resting induced cells of the microorganism Rhodococcus sp. strain DAP 96253. Rhodococcus sp. strain DAP 96253 was multiply induced by culturing the microorganism on nutritionally complete YEMEA medium supplemented with 150 ppm acetonitrile, 150 ppm acrylonitrile and 50 ppm succinonitrile. After induction, the cells were stored at 4° C. for 6 or 60 days and were referred to as resting cells. The NSB reaction mixture to be detoxified, at time zero contained acrylonitrile at 15 ppm, acetonitrile at 15 ppm and succinonitrile at 17,500 ppm. The resting cells were added to the NSB under conditions of 25° C. and an initial pH of 7. At the 140 minute time point, 100 ppm each of acetonitrile and acrylonitrile were added to the reaction mixture. At that time, the NSB reaction mixture contained acrylonitrile at 100 ppm, acetonitrile at 100 ppm, and succinonitrile at 0 ppm. Disappearance of acetonitrile, acrylonitrile and succinonitrile was monitored by GLC-FID. The results are shown in FIG. 5 for cells stored for 60 days.

Figure 5:
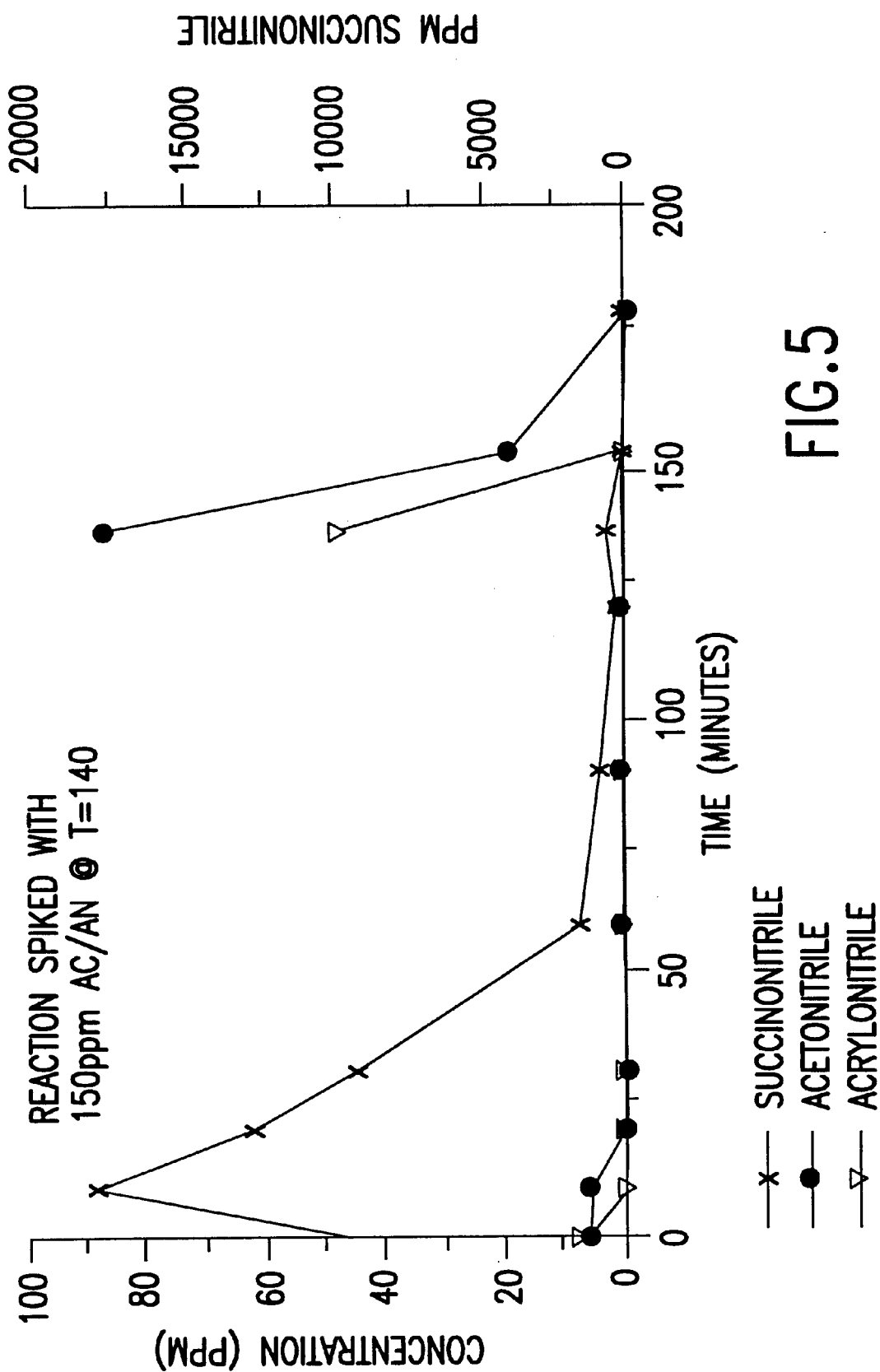
FIG. 5 is a graph showing the ability of Rhodococcus sp. strain DAP 96253 induced as taught herein and no longer actively dividing, to detoxify a net stripper bottom. See text, Section 11, for details.

The results presented in FIG. 5 demonstrate that a multiply induced strain of microorganism, which is no longer actively dividing, is able to detoxify a mixture of nitrile compounds on the order of hours. Cells stored for 6 days displayed similar detoxification activity. These results also demonstrate that detoxification activity is decoupled from growth. This is in accord with the fact that detoxification activity did not require oxygen.

12. EXAMPLE

Immobilization of Whole Cells in Polyacrylamide

Whole cells of Rhodococcus strain, DAP96253 were immobilized in polyacrylamide to anchor the cells in a stabile matrix. In addition, the polyacrylamide provides for mechanical integrity and strength which results in more effective retention of the cells in the reactor vessel and serves to stabilize the nitrilase and amidase activity in the cells.

10 grams of DAP 96253 multiply induced cells, wet weight, were suspended in 40 ml distilled water. The 40 ml of cells was added to 40 ml distilled water containing 4.5 g acrylamide and 0.5 g N-,N-methylene bisacrylamide. To the 80 ml solution, 5 ml α-dimethylaminoproprionitrile and 10 ml of a 2.5% potassium persulfate solution were added and the resultant mixture was stirred vigorously and then placed on ice. After the solution was polymerized, the polymerized solution was cut into small cubes which were washed with distilled water to remove any unpolymerized monomer.

13. EXAMPLE

Pilot Plant Scale Production of Multiply Induced Microorganisms

This example describes a pilot plant scale production of a multiply induced culture of DAP strain 96253. The initial medium used at the start of the production of microorganisms contained the following:

|  | (Grams/liter) |
|---|---|
| Yeast Extract | 0.5 |
| Proteose Peptone #3 | 0.5 |
| Casamino acids | 0.5 |
| Dextrose | 0.5 |
| Soluble Starch | 0.5 |
| Sodium Pyruvate | 0.3 |
| $K_2HPO_4$ | 0.3 |
| $MgSO_4$ | 0.05 |
| $CoCl_2$ | 10 mg |
| Urea | 7.5 |

Table XIII below shows additions to the basic medium made over the course of a 46 hour production run. A silicon-based anti-foaming agent not degraded by and not toxic to the microorganism was added.

TABLE XIII

| Time (hours) | Carbon Supplement* (ml/l) | Inducer Mixture** (ml/l) | Antifoam A (0.03% solution)*** (ml/l) | |
|---|---|---|---|---|
| 0 | 20 | 6.67 | 1 | |
| 6 | 20 | 6.67 | 1 | |
| 12 | 20 | 6.67 | 1 | |
| 17 | 10 | 1 | 1 | |
| 17.5 | 10 | — | — | |
| 18 | 10 | 1 | — | |
| 18.5 | 10 | — | — | |
| 19 | 10 | 1 | — | |
| 19.5 | 10 | — | — | |
| 20 | 20 | 6.67 | 1 | |
| 20.5 | 20 | — | — | |
| 23 | — | — | — | Harvest 1/3 to 1/2 of the reactor. Make up to original volume with initial medium. |
| 29 | 20 | 6.67 | 1 | |
| 35 | 20 | 6.67 | 1 | |
| 40 | 10 | 1 | 1 | |
| 40.5 | 10 | — | — | |
| 41 | 10 | 1 | 1 | |
| 41.5 | 10 | — | — | |

TABLE XIII-continued

| Time (hours) | Carbon Supplement* (ml/l) | Inducer Mixture** (ml/l) | Antifoam A (0.03% solution)*** (ml/l) | |
|---|---|---|---|---|
| 42 | 10 | 1 | 1 | |
| 42.5 | 10 | — | — | |
| 43 | 20 | 6.67 | 1 | |
| 43.5 | 20 | — | — | |
| 46 | — | — | — | Harvest all of run or harvest 1/3 to 1/2 of run and continue as above for 23 hours. |

*Carbon Supplement:
Yeast Extract = 16 g
Malt Extract = 63.9 g
Dextrose = 26.6 g
Distilled water = 1.0 liter
**Inducer Mixture:
Acetonitrile = 3.82 ml
Acrylonitrile = 3.72 ml
Succinonitrile = 1.015 g
KCN = NaCN = 0.02 g
Distilled water = 100 ml
***ANTIFOAM A ™ (silicon-based anti-foam, Dow Chem. Corp.)

14. EXAMPLE

Removal of Contaminating Acrylonitrile from Acrylamide Solution

Multiply induced cells, DAP 96253, obtained as described in Section 13 above, were immobilized either in polyacrylamide or in hardened alginate. The cells were then allowed to react with 50% acrylamide solution containing about 150 ppm acrylonitrile at 25° C. In 15 minutes, the acrylonitrile concentration was <50 ppm for the cells immobilized in polyacrylamide and <1 ppm for the cells immobilized in hardened alginate.

15. EXAMPLE

Removal of Contaminating Acrylamide Monomer from a Cationic Polyacrylamide Preparation 15.1 Use of an Immobilized Extract A crude cell extract of multiply induced DAP 96253 cells, obtained as described in Section 13 above, was immobilized on DOWEX™ ion exchange resin (Dow Chemical Co., Inc.). The immobilized extract was added directly to a commercial cationic polyacrylamide preparation having a pH of about 3.5. The reaction was carried out by mixing the preparation with the immobilized extract for 2 hours at 25–27° C.

The concentration of residual acrylamide monomer in the cationic polyacrylamide preparation was reduced by about 50 to 60% after 2 hours.

15.2 Use of Immobilized Microorganisms

Multiply induced cells, DAP 96253, are obtained as described in Section 13 above, and are immobilized on DOWEX™ ion exchange resin (Dow Chemical Co., Inc.). The immobilized cells are added directly to a commercial cationic polyacrylamide preparation, which has a pH of about 3.5. The reaction is carried out by mixing the preparation with the immobilized cells for a sufficient time, e.g., 2 hours at about ambient temperature, e.g., 25–27° C., and the concentration of the amide monomer is monitored.

16. DEPOSIT OF MICROORGANISMS

The following microorganisms were deposited on December 10, 1996 with the American Type Culture Collection (ATCC), Rockville, Md., and have been assigned the indicated Accession numbers:

| Microorganism | ATCC Accession No. |
|---|---|
| Rhodococcus sp. DAP 96253 | 55899 |
| Rhodococcus rhodochrous DAP 96622. | 55898 |

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference.

What is claimed is:

1. A method for removing unwanted amide monomer from a polyamide preparation containing said monomer by converting the amide monomer to the corresponding acid, comprising contacting a pure culture or an extract of a multiply induced microorganism, with a polyamide preparation containing amide monomer, said polyamide preparation having a pH of about 2 to less than 6, for a sufficient time to convert the amide monomer to the corresponding acid.

2. The method according to claim 1, in which the pure culture or extract is encapsulated or immobilized.

3. The method according to claim 2, in which the pure culture or extract is immobilized onto a solid support selected from the group consisting of granular activated carbon, wood chips, alumina, ruthenium, iron oxide, ceramic beads, alginate beads, K-carrageenan cubes, and ion exchange resin.

4. The method according to claim 2, in which the culture or extract is immobilized on a planar surface.

5. The method according to claim 1, in which the polyamide preparation is a polyacrylamide preparation.

6. The method according to claim 1, in which the microorganism is selected from the group consisting of microorganisms having ATCC Accession Nos. 55899, 55898, 55722, 55723, 55726, 55727, 55724 and 55725 and which has been multiply induced.

7. The method according to claim 1, in which the multiply induced microorganism is obtained by a method comprising culturing a pure culture of a microorganism in a culture medium supplemented with a mixture of nitrile compounds containing at least one of acetonitrile and acrylonitrile at a concentration of about 150 ppm each and succinonitrile and fumaronitrile at a concentration of about 50 ppm each.

8. The method according to claim 7, in which the culture medium is supplemented with a mixture of nitrile compounds containing acetonitrile and acrylonitrile at about 150 ppm each and succinonitrile at about 50 ppm.

9. The method according to claim 7, in which the culture medium is supplemented further with about 1–10 ppm KCN or NaCN.

10. The method according to claim 1, in which the multiply induced microorganism is obtained by a method comprising culturing a pure culture of a microorganism in a culture medium supplemented with a mixture of nitrile and amide compounds containing (a) at least one of succinonitrile at about 50 ppm, acetonitrile at about 150 ppm and acrylonitrile at about 150 ppm and (b) acetamide and acrylamide at about 150 ppm each.

11. The method according to claim 10, in which the culture medium is supplemented with a mixture of nitrile and amide compounds containing succinonitrile at about 50 ppm and acetamide at about 150 ppm and acrylamide at about 150 ppm.

12. The method according to claim 10, in which the culture medium is supplemented further with about 1–10 ppm KCN or NaCN.

13. A method for removing unwanted amide monomer from a polyamide preparation containing said monomer by converting the amide monomer to the corresponding acid, comprising contacting, at a pH of about 2 to less than 6, a pure culture or extract of a multiply induced microorganism, an amide monomer with a polymerizing agent.

14. The method according to claim 13, in which the pure culture or extract is encapsulated or immobilized.

15. The method according to claim 14, in which the pure culture or extract is immobilized onto a solid support selected from the group consisting of granular activated carbon, wood chips, alumina, ruthenium, iron oxide, ceramic beads, alginate beads, κ-carrageenan cubes, and ion exchange resin.

16. The method according to claim 14, in which the culture or extract is immobilized on a planar surface.

17. The method according to claim 13, in which the amide monomer is acrylamide.

18. The method according to claim 13, in which the microorganism is selected from the group consisting of microorganisms having ATCC Accession Nos. 55899, 55898, 55722, 55723, 55726, 55727, 55724 and 55725 and which has been multiply induced.

19. The method according to claim 13, in which the multiply induced microorganism is obtained by a method comprising culturing a pure culture of a microorganism in a culture medium supplemented with a mixture of nitrile compounds containing at least one of acetonitrile and acrylonitrile at a concentration of about 150 ppm each and succinonitrile and fumaronitrile at a concentration of about 50 ppm each.

20. The method according to claim 19, in which the culture medium is supplemented with a mixture of nitrile compounds containing acetonitrile and acrylonitrile at about 150 ppm each and succinonitrile at about 50 ppm.

21. The method according to claim 19, in which the culture medium is supplemented further with about 1–10 ppm KCN or NaCN.

22. The method according to claim 13, in which the multiply induced microorganism is obtained by a method comprising culturing a pure culture of a microorganism in a culture medium supplemented with a mixture of nitrile and amide compounds containing (a) at least one of succinonitrile at about 50 ppm, acetonitrile at about 150 ppm and acrylonitrile at about 150 ppm and (b) acetamide and acrylamide at about 150 ppm each.

23. The method according to claim 22, in which the culture medium is supplemented with a mixture of nitrile and amide compounds containing succinonitrile at about 50 ppm and acetamide at about 150 ppm and acrylamide at about 150 ppm.

24. The method according to claim 22, in which the culture medium is supplemented further with about 1–10 ppm KCN or NaCN.

25. The method according to claim 1, in which the polyacrylamide preparation contains acrylamide monomer at a concentration of about 1,000–40,000 ppm.

26. The method according to claim 1, in which the polyacrylamide preparation also contains an unwanted nitrile monomer and which is removed by the conversion of the monomer to the corresponding acid.

27. The method according to claim 13, in which the polyacrylamide preparation also contains an unwanted nitrile monomer and which is removed by the conversion of the monomer to the corresponding acid.

* * * * *